US006687857B1

(12) United States Patent
Iwata et al.

(10) Patent No.: US 6,687,857 B1
(45) Date of Patent: Feb. 3, 2004

(54) MICROCOMPUTER WHICH CAN EXECUTE A MONITOR PROGRAM SUPPLIED FROM A DEBUGGING TOOL

(75) Inventors: Shunichi Iwata, Tokyo (JP); Takashi Nasu, Tokyo (JP); Fumitaka Fukuzawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/552,726

(22) Filed: Apr. 19, 2000

(30) Foreign Application Priority Data

Nov. 10, 1999 (JP) .......................... 11-319876

(51) Int. Cl.⁷ .................. H02H 3/05; G01R 31/28; G06F 9/44
(52) U.S. Cl. .................. 714/38; 714/30; 714/726; 714/727; 717/124
(58) Field of Search .............. 714/25, 30, 27, 714/726, 727; 717/124

(56) References Cited

U.S. PATENT DOCUMENTS

| 5,218,525 A | * | 6/1993 | Amasaki et al. ............... 700/26 |
| 5,254,942 A | * | 10/1993 | D'Souza et al. ............ 714/727 |
| 5,377,198 A | * | 12/1994 | Simpson et al. ............ 714/727 |
| 5,463,637 A | * | 10/1995 | Hayashi ...................... 714/718 |
| 5,479,652 A | * | 12/1995 | Dreyer et al. ................. 714/30 |
| 5,590,354 A | * | 12/1996 | Klapproth et al. ............ 714/30 |
| 5,943,498 A | * | 8/1999 | Yano et al. ................. 717/128 |
| 5,995,993 A | * | 11/1999 | Liang ......................... 708/525 |
| 6,094,729 A | * | 7/2000 | Mann ........................... 714/25 |
| 6,122,762 A | * | 9/2000 | Kim ............................ 714/726 |
| 6,209,045 B1 | * | 3/2001 | Hasegawa et al. ............ 710/15 |

FOREIGN PATENT DOCUMENTS

| JP | 8-185336 | 7/1996 |
| JP | 9-319727 | 12/1997 |
| JP | 10-214201 | 8/1998 |

OTHER PUBLICATIONS

"IEEE Standard Test Access Port and Boundary–Scan Architecture" IEEE Computer Society, Sponsored by the Test Technology Standards Committee, IEEE Std 1149.1–1990 (includes IEEE Std 1149.1a–1993), Oct. 21, 1993.

* cited by examiner

Primary Examiner—Robert Beausoliel
Assistant Examiner—Emerson Puente
(74) Attorney, Agent, or Firm—Burns, Doane, Swecker & Mathis, LLP

(57) ABSTRACT

A microcomputer comprises a serial interface for receiving a debugging program applied thereto from a debugging tool, a register for holding an instruction code included with the debugging program, which is applied to the microcomputer via the serial interface, and a central processing unit or CPU for executing the instruction code held by the first register to debug the microcomputer. The microcomputer can further comprise a buffer for holding one or more instruction codes supplied thereto from the register. The CPU can execute each of the plurality of instruction codes held by the buffer. Preferably, the serial interface is a JTAT (Joint Test Action Group) interface.

18 Claims, 17 Drawing Sheets

MICROCOMPUTER WHICH CAN EXECUTE A MONITOR PROGRAM SUPPLIED FROM A DEBUGGING TOOL

BACKGROUND OF THE INVENTION

1. Field of the Invention

The present invention relates to a microcomputer that can be debugged while it is in practical use.

2. Description of the Prior Art

Referring next to FIG. 14, it illustrates a block diagram showing the structure of a prior art microcomputer as disclosed, as a first conventional example, in Japanese Patent Application Publication (TOKKAIHEI) No. 8-185336, for example. In the figure, reference numeral 1 denotes a user target system, such as a microcomputer-equipped appliance, and numeral 2 denotes a host computer. The user target system 1 includes a serial interface 3 connected to the host computer 2, a memory 4, a monitor program 5 stored in the memory 4, an I/O 6, a microprocessor 7, a register built in the microprocessor 7, and a processor bus 9.

When debugging the user target system 1, the host computer 2 is connected to the serial interface 3. The microcomputer 7 can execute the monitor program 5 to access the memory 4, the I/O 6, and the register 8 by the processor bus 9. The microcomputer 7 can execute and control a user program using a software break instruction and then furnish execution results to the host computer 2 by way of the serial interface 3.

Referring next to FIG. 15, it illustrates a block diagram showing the structure of another prior art microcomputer as disclosed, as a second conventional example, in Japanese Patent Application Publication (TOKKAIHEI) No. 8-185336, for example. In the figure, reference numeral 11 denotes a debugging tool. A microprocessor 7 includes a register 12, a sequencer 13, a bus controller 14, and a transmission path 15. The other structure of the microcomputer of FIG. 15 is the same as that of the microcomputer of FIG. 14.

When debugging the user target system 1, the debugging tool 11 and host computer 2 are connected to the serial interface 3. The debugging tool 11 converts a command from the host computer 2 into an equivalent command intended for debugging, which can be understood by the sequencer 13 of the microprocessor 7. The sequencer 13 of the microprocessor 7 can suspend the execution of a user program according to the command intended for debugging, and access the register 12 by way of the transmission path 15 and the memory 4 or I/O 6 using the bus controller 14. The sequencer 13 of the microprocessor 7 can furnish execution results to the debugging tool 11 by way of the serial interface 3. The debugging tool 11 can convert the execution results into equivalent data which can be understood by the host computer 2 and then furnish the data to the host computer 2.

Referring next to FIG. 16, it illustrates a block diagram showing the structure of another prior art microcomputer as disclosed, as a third conventional example, in Japanese Patent Application Publication (TOKKAIHEI) No. 8-185336, for example. A debugging tool 11 as shown in the figure includes a microprocessor 21 intended for debugging, a monitor program memory 22, and a trace memory 23. The other structure of the microcomputer of FIG. 16 is the same as that of the microcomputer of FIG. 14.

In general, the debugging system as shown in FIG. 16 is called in-circuit emulator. When debugging the user target system 1, the microprocessor 7 is removed from the user target system 1. As an alternative, the microprocessor 7 is disabled. A probe of the debugging tool 11 can be connected to the part of the bus 9 to which the microprocessor 7 was connected, so that the debugging microprocessor 21 can alternatively operate. The debugging microprocessor 21 can execute a monitor program stored in the monitor program memory 22 built in the debugging tool 11 to control execution of a user program or access the memory 4 or I/O 6. The debugging microprocessor 21 can execute a program stored in the memory 4 built in the user target system 1 as if the microprocessor 7 does. The debugging tool 11 includes the trace memory 23 to trace the status of the processor bus of debugging microprocessor 21. The debugging microprocessor 21 can furnish trace information that cannot be obtained from the microprocessor 7. Part of the internal state of the debugging microprocessor 21, which cannot be traced via the processor bus 9, can be traced.

Referring next to FIG. 17, it illustrates a block diagram showing the structure of another prior art microcomputer as disclosed, as a fourth conventional example, in Japanese Patent Application Publication (TOKKAIHEI) No. 8-185336, for example. In the figure, reference numeral 31 denotes a logic analyzer connected to a user target system 1. The other structure of the microcomputer of FIG. 17 is the same as that of the microcomputer of FIG. 14.

In general, the debugging system as shown in FIG. 17 is called pre-processors. When debugging the user target system 1, a probe of the logic analyzer 31 is connected to a processor bus 9 built in the user target system 1, so that accesses to a memory 4 and an I/O 6 by a microprocessor 7 can be traced.

Referring next to FIG. 18, it illustrates a block diagram showing the structure of another prior art microcomputer as disclosed, as an embodiment, in Japanese Patent Application Publication (TOKKAIHEI) No. 8-185336, for example. A debugging tool 11 as shown in the figure includes a monitor program 41. A user target system 1 includes an external debugging interface 42. A microprocessor 7 includes a processor core 43, a debugging module 44, an internal debugging interface 45, and an internal processor bus 46. The other structure of the debugging system of FIG. 18 is the same as that of the debugging system of FIG. 14.

When debugging the user target system 1, the debugging tool 11 is connected to the external debugging interface 42 of the user target system. The processor core 43 can execute the monitor program 41 stored in the debugging tool 11 by way of the internal debugging interface 45 and the debugging module 44. At that time, the processor core 43 furnishes an address and size information to the debugging tool 11. The debugging tool 11 then furnishes a corresponding code of the monitor program 41 to the core processor 43. The monitor program 41 can implement execution control functions, such as reading and writing of a memory 4 or an I/O 6, setting of hardware break points, and specifying of the starting address at which the execution of the user program is to be started. The debugging module 44 can implement a serial monitor bus function, which is enabled in debugging mode, and a PC trace function, a trace trigger function, a hardware break function, a software break function, a debugging interruption function, a debugging reset function, and a mask function, which are enabled in normal mode.

A problem with the prior art debugging system as shown in FIG. 14 is that the monitor program 5 used for debugging a user program has to be pre-stored in the memory 4 of the user target system 1 and this results in upsizing of the memory 4. A further problem is that when the memory 4 storing the user program to be debugged becomes unstable, the monitor program 5 for debugging the user program becomes unstable, too, thus being unable to debug the user program with reliability.

A problem with the prior art debugging system as shown in FIG. 15 is that the transmission path 15 and the bus controller 14 intended for debugging have to be provided in order to access the register 12, and this results in upsizing of the debugging system and hence an increase in the area of the chip.

A problem with the prior art debugging system as shown in FIG. 16 is that since the connection between the user target system 1 and the debugging tool 11 is established by a probe, the connection by the probe easily becomes unstable and the user target system 1 therefore becomes unstable. Another problem is that a variety of probes must be prepared for a variety of types of user target system 1.

The prior art debugging system as shown in FIG. 17 faces the same problems as those that arises in the prior art debugging system as shown in FIG. 16. A further problem with the prior art debugging system of FIG. 17 is that the system does not include any function of controlling execution of the microprocessor 7 and therefore it cannot debug a user program in detail.

A problem with the prior art debugging system as shown in FIG. 18 is that the processor core 43 has to furnish an address and size information to the debugging tool 11 to access the monitor program 41 and the debugging system therefore cannot execute the monitor program 41 at a high speed.

SUMMARY OF THE INVENTION

The present invention is proposed to solve the above problems. It is therefore an object of the present invention to provide a microcomputer capable of reducing the size of a debugging system required for debugging the microcomputer including a user program to be executed by the microcomputer and allowing the debugging system to debug the microcomputer with reliability and with efficiency by enabling a CPU built in the microcomputer to execute a debugging program supplied from a debugging tool disposed outside the microcomputer.

In accordance with one aspect of the present invention, there is provided a microcomputer comprising: a serial interface for receiving a debugging program applied thereto from a debugging tool; a first register for holding an instruction code included with the debugging program, which is applied to the microcomputer via the serial interface; and a central processing unit or CPU for executing the instruction code held by the first register.

Preferably, the microcomputer can further comprise a buffer for holding one or more instruction codes supplied thereto from the first register. The CPU can execute each of the plurality of instruction codes held by the buffer. Preferably, the serial interface is a JTAT (Joint Test Action Group) interface.

The buffer can include a plurality of storage areas for storing a plurality of instruction codes sequentially furnished thereto from the first register, and the first register holds an entry specifying code specifying in which area of the buffer a next instruction code from the first register, which is included with the debugging program and is applied to the microcomputer via the serial interface, is to be stored, as well as the instruction code. Further, the microcomputer can further comprise an input control unit for furnishing the instruction code held by the first register to a storage area of the buffer specified by the entry specifying code to allow the storage area to hold the instruction code. As an alternative, the buffer includes a plurality of storage areas for storing a plurality of instruction codes sequentially furnished thereto from the first register, and the microcomputer further comprises an input control unit for, when the microcomputer sequentially receives a plurality of instruction codes from the debugging tool, sequentially furnishing the plurality of instruction codes sequentially held by the first register to the respective storage areas of the buffer, to allow the plurality of storage areas to hold the plurality of instruction codes, respectively.

In accordance with a preferred embodiment, the microcomputer further comprises a valid control unit for generating a valid signal indicating whether the instruction code held by the first register is valid or invalid, and a second register for holding the value of the valid signal generated by the valid control unit, for enabling the debugging tool to read the value of the valid signal byway of the serial interface.

In accordance with another preferred embodiment, the microcomputer further comprises a valid control unit for generating a valid signal indicating whether the instruction code held by the first register is valid or invalid, and an internal bus interface unit for furnishing a negated access completion signal to the CPU when the valid signal generated by the valid control unit indicates that the instruction code held by the first register is invalid, and for furnishing an asserted access completion signal to the CPU when the valid signal generated by the valid control unit indicates that the instruction code held by the first register is valid.

In accordance with another preferred embodiment, the microcomputer further comprises a valid control unit for generating a valid signal indicating whether the instruction code held by the first register is valid or invalid, and an output control unit, responsive to an instruction-fetching request from the CPU, for furnishing a branch instruction to prevent a program counter's current value from incrementing to the CPU when the valid signal generated by the valid control unit indicates that the instruction code held by the first register is invalid. The output control unit can furnish the branch instruction to prevent the program counter's current value from incrementing to the CPU when the instruction-fetching request is an instruction-prefetching request or when the valid signal generated by the valid control unit indicates that the instruction code held by the first register is invalid.

In accordance with another preferred embodiment, the microcomputer further comprises a second register for holding the value of an instruction code setting completion signal applied thereto by way of the serial interface, indicating that one or more instruction codes have already been set to the buffer; an instruction code setting completion detecting unit for determining whether or not the second register is holding the value of the instruction code setting completion signal; and a valid control unit for generating a valid signal indicating that one or more instruction codes held by the buffer are valid when the instruction code setting completion signal unit detects the holding of the value of the instruction code setting completion signal.

In accordance with another preferred embodiment, the microcomputer further comprises a third register into which the CPU can write data, for enabling the debugging tool to read the data by way of the serial interface. The microcomputer can further comprise a valid control unit for generating a valid signal indicating whether data held by the third register is valid or invalid, and a second register for holding the value of the valid signal generated by the valid control unit and for enabling the debugging tool to read the value of the valid signal by way of the serial interface.

In accordance with another preferred embodiment, the microcomputer further comprises a fourth register for holding data applied thereto by way of the serial interface. The CPU can read the data held by the fourth register. The microcomputer can further comprise a valid control unit for generating a valid signal indicating whether data held by the fourth register is valid or invalid, and a second register for holding the value of the valid signal generated by the valid control unit and for enabling the debugging tool to read the value of the valid signal by way of the serial interface.

Preferably, the serial interface and the first register operate on a first clock, and the buffer and the CPU operate on a second clock independent of the first clock.

In accordance with a preferred embodiment of the present invention, the microcomputer further comprises: a second register that operates on the first clock, for holding the value of a signal indicating whether an instruction code can be set to the first register and for enabling the debugging tool to read the value of the signal by way of the serial interface; an access detecting unit that operates on the first clock, for generating an access detection signal when detecting an access from the debugging tool to the first register; an access detection signal transmitting unit that operates on the second clock, for generating an access detection recognition signal in response to the access detection signal from the access detecting unit; a valid control unit that operates on the second clock, for generating a valid signal indicating that one or more instruction codes held by the buffer are valid or invalid; and a second-register control unit that operates on the first clock, for causing the second register to hold a value indicating that any instruction code cannot be set to the first register in response to the access detection signal from the access detecting unit, and for causing the second register to hold the value of the valid signal generated by the valid control unit in response to the access detection recognition signal from the access detection signal transmitting unit.

In accordance with another preferred embodiment of the present invention, the microcomputer further comprises: a second register that operates on the first clock, for holding the value of a signal indicating whether one or more instruction codes have already been set to the buffer; an instruction code setting completion detecting unit that operates on the first clock, for generating an instruction code setting completion signal when determining that the second register is holding the value of the signal; an instruction code setting completion signal transmitting unit that operates on the second clock, for generating an instruction code setting completion recognition signal in response to the instruction code setting completion signal from the instruction code setting completion signal unit; a valid control unit that operates on the second clock, for generating a valid signal indicating that the one or more instruction codes held by the buffer are valid or invalid; and a second-register control unit that operates on the first clock, for causing the second register to hold a value indicating that one or more instruction codes have already been set to the buffer in response to the instruction code setting completion signal from the instruction code setting completion generating unit, and for causing the second register to hold the value of the valid signal generated by the valid control unit in response to the instruction code setting completion recognition signal from the instruction code setting completion signal transmitting unit.

In accordance with another preferred embodiment of the present invention, the microcomputer further comprises: a second register that operates on the first clock, for holding the value of a signal indicating whether data held by a third register is valid or invalid, and for enabling the debugging tool to read the value of the signal by way of the serial interface; an access detecting unit that operates on the first clock, for generating an access detection signal when detecting an access from the debugging tool to the third register; an access detection signal transmitting unit that operates on the second clock, for generating an access detection recognition signal in response to the access detection signal from the access detecting unit; a valid control unit that operates on the second clock, for generating a valid signal indicating that data held by a fifth register is valid or invalid; and a second-register control unit that operates on the first clock, for causing the second register to hold a value indicating that the data held by the third register is invalid in response to the access detection signal from the access detecting unit, and for causing the second register to hold the value of the valid signal generated by the valid control unit in response to the access detection recognition signal from the access detection signal transmitting unit.

In accordance with another preferred embodiment of the present invention, the microcomputer further comprises: a second register that operates on the first clock, for holding the value of a signal indicating whether data held by a fourth register has already been read by the CPU, and for enabling the debugging tool to read the value of the signal by way of the serial interface; an access detecting unit that operates on the first clock, for generating an access detection signal when detecting an access from the debugging tool to the fourth register; an access detection signal transmitting unit that operates on the second clock, for generating an access detection recognition signal in response to the access detection signal from the access detecting unit; a valid control unit that operates on the second clock, for generating a valid signal indicating whether data that has been transferred from the fourth register and is held by a sixth register is valid or invalid; and a second-register control unit that operates on the first clock, for causing the second register to hold a value indicating that the data held by the fourth register has not been read yet by the CPU in response to the access detection signal from the access detecting unit, and for causing the second register to hold the value of the valid signal generated by the valid control unit in response to the access detection recognition signal from the access detection signal transmitting unit.

Further objects and advantages of the present invention will be apparent from the following description of the preferred embodiments of the invention as illustrated in the accompanying drawings.

DETAILED DESCRIPTION OF THE PREFERRED EMBODIMENT

Figure 1:
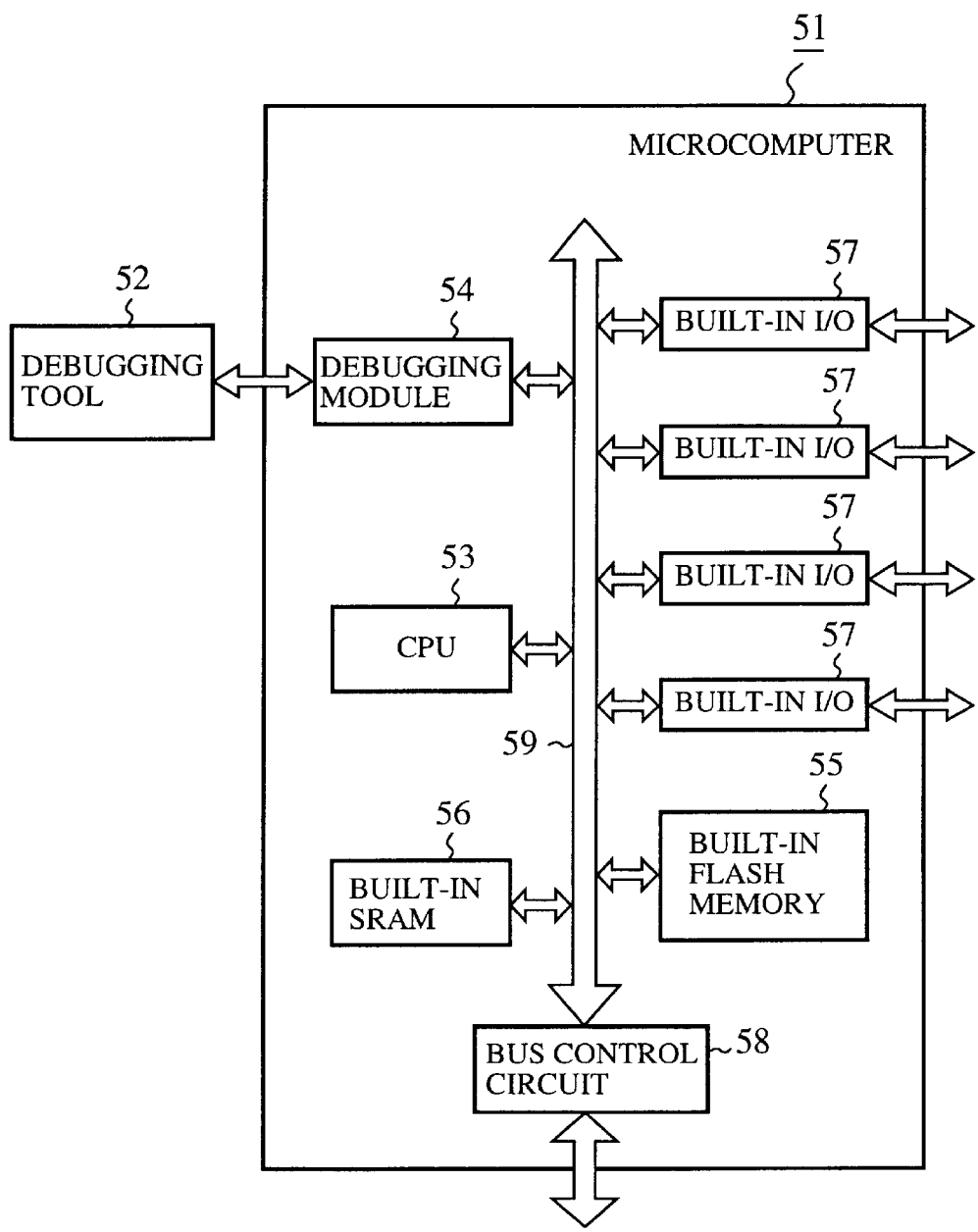
FIG. 1 is a block diagram showing the structure of a microcomputer according to an embodiment of the present invention.

Referring next to FIG. 1, it illustrates a block diagram showing the structure of a microcomputer according to an embodiment of the present invention. In the figure, reference numeral 51 denotes a one-chip microcomputer, which can be disposed in microcomputer-equipped appliances, and numeral 52 denotes a general-purpose debugging tool, which can be connected to the microcomputer 51 when debugging the microcomputer 51. The microcomputer 51 comprises a CPU 53, which is a microprocessor, provided with sixteen 32-bit general-purpose registers R0 to R15, a debugging module 54, which is a characterized part of the present invention, a built-in flash memory 55 for storing a user program and so forth, a built-in SRAM 56, a plurality of built-in peripheral I/Os 57, such as a DMA controller, an interruption controller, and a timer, a bus control circuit 58, and a 32-bit internal bus 59 for connecting those components with one another.

Figure 2:
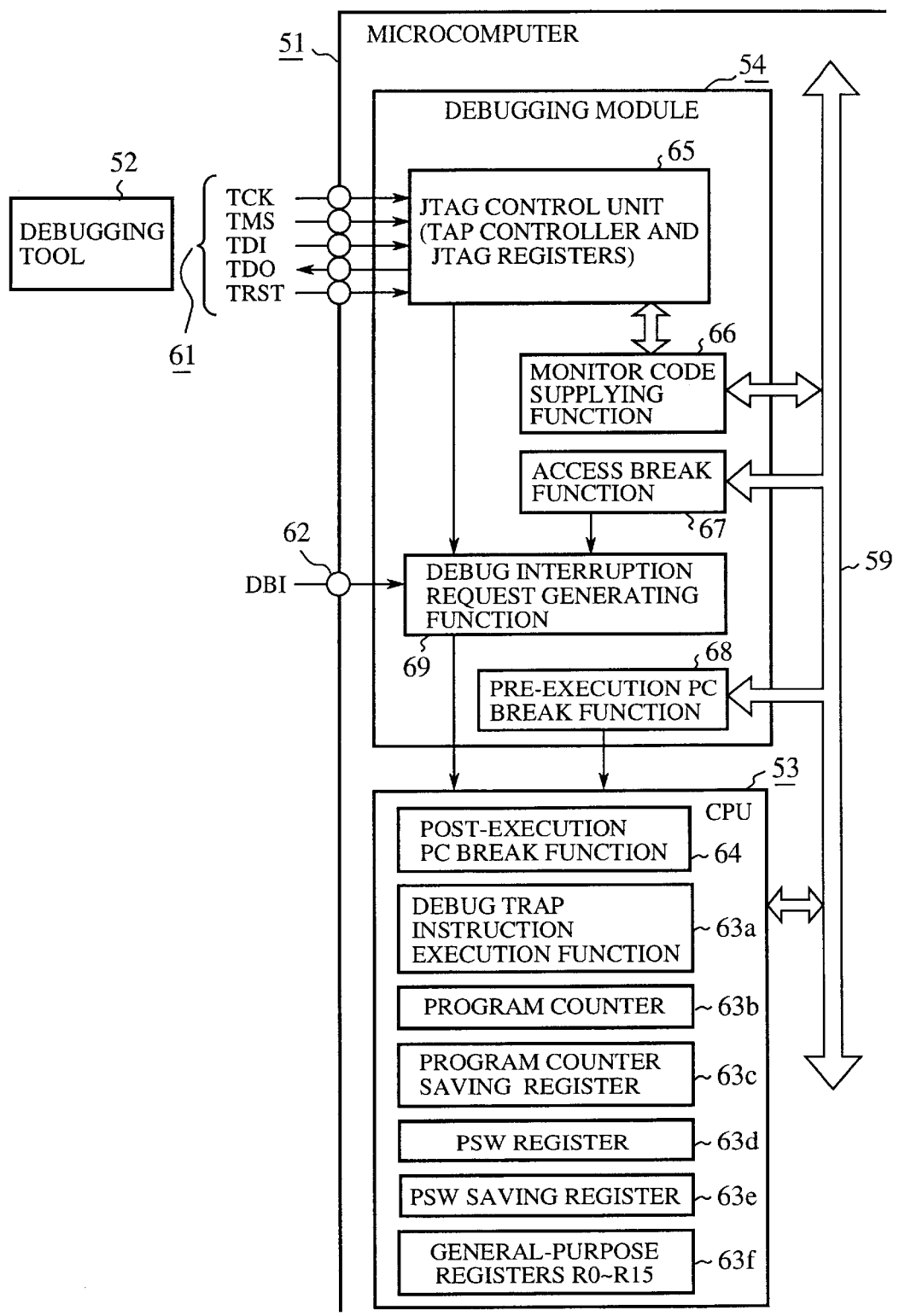
FIG. 2 is a block diagram showing the detailed structure of a CPU and a debugging module included with the microcomputer according to the embodiment of the present invention.

Referring next to FIG. 2, it illustrates the detailed structure of the CPU and the debugging module disposed in the microcomputer according to the present invention. In the figure, reference numeral 61 denotes a JTAG interface for connecting the debugging module 54 to the debugging tool 52 which is disposed outside the microcomputer. The JATG interface 61 conforms to the IEEE 1149.1 standard, and includes five terminals: a TCK terminal for receiving a clock, a TDI terminal for serially receiving test instruction codes or test data, a TDO terminal for serially transmitting test instruction codes or test data, a TMS terminal for receiving a test mode selection signal to control a transition in the status of a test circuit, and a TRST terminal for receiving a test reset signal to asynchronously initialize the test circuit. Reference numeral 62 denotes a DBI terminal for receiving a debug interruption to the CPU 53 from outside the chip.

The CPU 53 comprises a debug trap instruction execution function 63a that is a function of executing a trap instruction intended for debugging. When the CPU 53 performs the debug trap instruction execution function 63a, a debug event occurs and the CPU 53 switches to debugging mode. The CPU 53 further comprises a program counter 63b for storing the address of an instruction being executed by the CPU 53, a program counter saving register 63c for saving the contents of the program counter 63b when a debug event or the like occurs, a PSW register 63d for showing the status of the CPU 53, and a PSW saving register 63e for storing the contents of the PSW register 63d when a debug event occurs. In addition to those components, the CPU 53 includes a function of performing instructions, such as a load instruction, a store instruction, a branch instruction, and an addition instruction, and sixteen general-purpose registers 63f. Since the present invention does not directly relate to the function and the plurality of general-purpose registers, the description of those components will be omitted hereinafter. Reference numeral 64 denotes a post-execution PC break function of presetting the program counter value of a target instruction and causing a debug event to occur immediately after the execution of a target instruction, and then switching to debugging mode.

The debugging module 54 comprises a JTAG control unit 65 for communicating with the debugging tool 52 by way of the JTAG interface 61 to control a debugging function, the JTAG control unit 65 including a plurality of JTAG registers that can be accessed by way of the JTAG interface 61, for storing information associated with debugging, and a TAP controller for controlling accesses via the JTAG interface 61, a monitor code supplying function 66, which is a characterized part of the present invention, of executing a CPU instruction by way of the JTAG interface 61, an access break function 67 of detecting a data access that satisfies a preset condition defining a target data access and then making a debug interruption request of the CPU 53, a pre-execution PC (program counter) break function 68 of detecting fetching of a target instruction when the program counter value of the target instruction is preset, and then making a pre-execution break request of the CPU 53, so that in response to the pre-execution break request, the CPU 53 causes a debug event to occur immediately before the execution of the target instruction and then switches to debugging mode, and a debug interruption request generating function 69 of implementing a logical OR operation on debug interruption requests applied thereto by way of the DBI terminal 62, and from the JTAG control unit 65 and the access break function 67, to unify them into a request for a debug interruption, which is an interruption for intended for debugging, addressed to the CPU 53. When the CPU 53 receives a debug interruption request from the debug interruption request generating function 69, it causes a debug event to occur and then switches to debugging mode.

As previously mentioned, the microcomputer 51 includes the debugging function, and the debugging module 54 is the main component for controlling the debugging function.

Next, a supplementary explanation of JTAG will be given. Performing a board-level test on microcomputer-equipped appliances has become more difficult because of high-density packaging, tighter packing and scale-up of devices, and reduction in pitches between pads, pins, leads, and so on formed on devices. For the purpose of solving the problem with such a board-level test, European semiconductor, electronics makers and tester makers played a leading role in organizing Joint Test Action Group or JTAG. The board-level testing method proposed by JTAG is called boundary scan testing method. The method is standardized as IEEE Standard Test Access Port and Boundary Scan Architecture (IEEE Std. 1149.1a-1993).

In the boundary scan testing method, a scan register circuit (or boundary scan) is inserted between input/output pins of each device mounted on the board and an internal circuit, and a control circuit and special-purpose pins are provided. On the board, the boundary scan for each device is connected to all other boundary scans disposed for other devices and data input/output is performed serially using special-purpose ports to enable accesses to and control of all scan registers. It is thus possible to test connections between devices mounted on the board and the inner workings of each device without having to make any probe for testing come into contact with the board, by serially applying instructions and data to the boundary scan for each device, and observing data serially furnished out of the boundary scan for each device.

The boundary scan consists of following components:
(a) Test Access Port or TAP;
  The TAP is a port via which data is applied to or furnished from the boundary scan, and via which a control signal is applied to the boundary scan. The TAP corresponds to the JTAG interface 61 as shown in FIG. 2.
(b) TAP controller;
  The TAP controller switches between modes according to inputs applied to the TCK and TMS terminals, and controls the test circuit.
(c) instruction register;
  The instruction register holds and decodes a test instruction code to generate and furnish a control signal to the test circuit. The test instruction code can be the code of a SAMPLE/PRELOAD instruction, an EXTEST instruction, a BYPASS instruction, or the like. The code of a private instruction intended for the corresponding device can be added as the test instruction code. The microcomputer of this embodiment includes some private instructions intended for the debugging function.
(d) data register;
  There are provided two types of data registers: a one-bit bypass register disposed between the TDI terminal and the TDO terminal, and used for bypassing the test circuit, and a boundary scan register including a number of shift registers in series, which are disposed between the internal circuit of the corresponding device and pins, respectively. In addition, a further data register intended for the corresponding device can be provided. The microcomputer of this embodiment includes some data registers intended for the debugging function.

Figure 3:
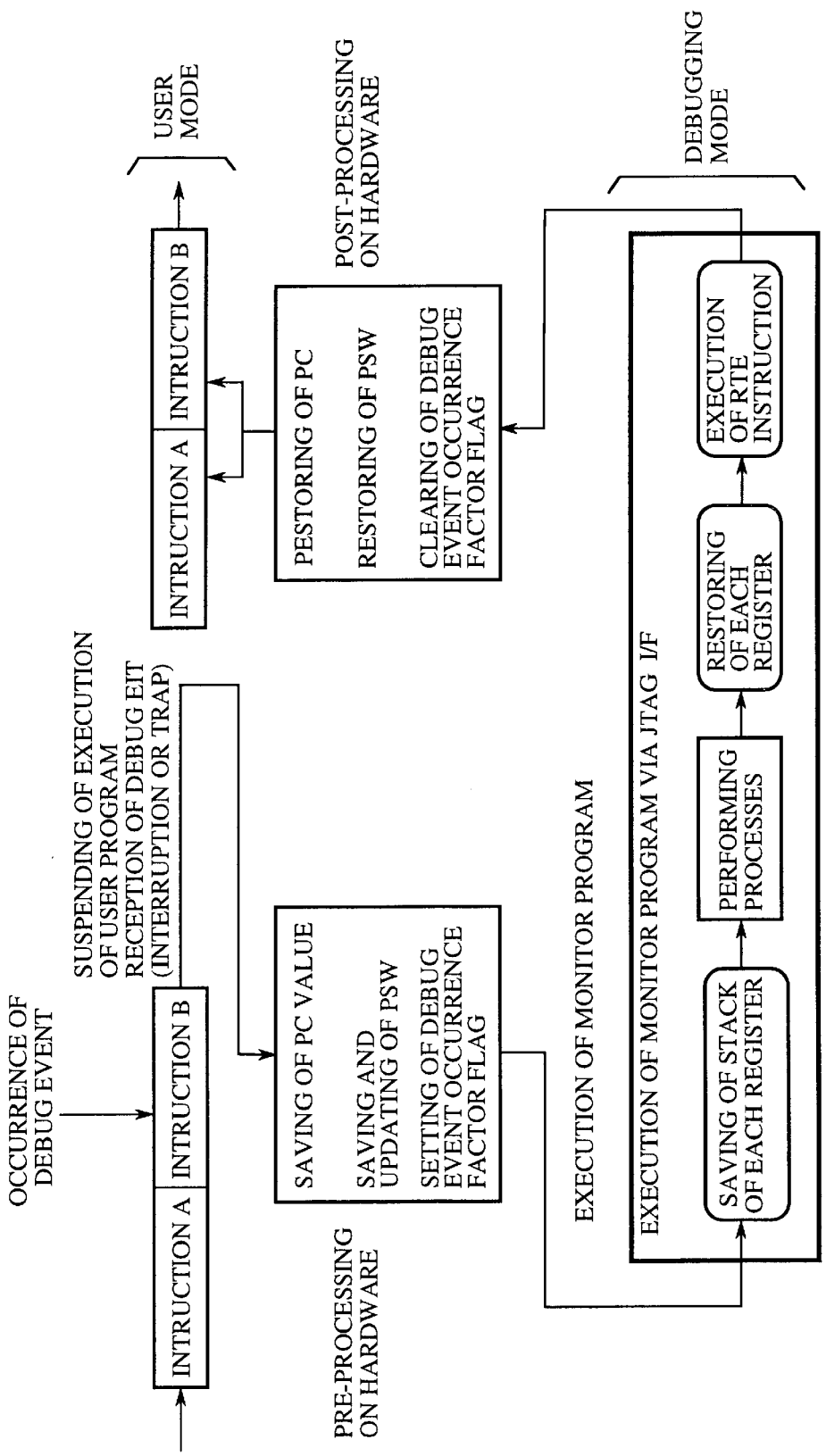
FIG. 3 is a diagram showing procedures processed when a debug event occurs, according to the present invention.

Referring next to FIG. 3, it illustrates procedures processed when a debug event occurs. The microcomputer 51 has two execution modes: user mode and debugging mode. In the user mode, the microcomputer 51 executes a user program. When a debug event occurs during the execution of the user program, the microcomputer 51 switches from the user mode to the debugging mode. In the debugging mode, the microcomputer 51 executes a monitor program (i.e., debugging program) supplied by the debugging tool 52.

There is a variety of debug events including execution of a debug trap instruction, a request for a debug interruption, and a request for pre-execution or post-execution program counter break. When a debug event occurs, the CPU 53 automatically performs the following processes.
  (a) Saving of the contents of the program counter 63*b* in the program counter saving register 63*c*;
  (b) Updating of the contents of the PSW register 63*d* after saving the contents of the PSW register 63*d* in the PSW saving register 63*e*.

After that, the debugging module 54 automatically performs the following processing, and the microcomputer 51 switches to the debugging mode.
  (a) Setting of a debug event occurrence factor flag indicating why the debug event occurs to a JTAG register included with the JTAG control unit 65.
  (b) branching to the vector address of the debug event.

After the CPU 53 of the microcomputer 51 branches to the vector address, the debugging tool 52 executes the monitor program by supplying one or more instruction codes to the CPU 53 using the monitor code supplying function 66.

When the CPU 53 executes a return-to-user mode instruction or RTE instruction to return to the user mode, it switches from the debugging mode to the user mode. When the microcomputer 51 switches to the user mode, the debugging module 54 clears the debug event occurrence factor flag. After that, the CPU 53 restores the value saved in the PSW saving register 63*e* in the PSW register 72, restores the value saved in the program counter saving register 63*c* in the program counter 63*b*, and then branches to the address specified by the program counter value.

Figure 4:
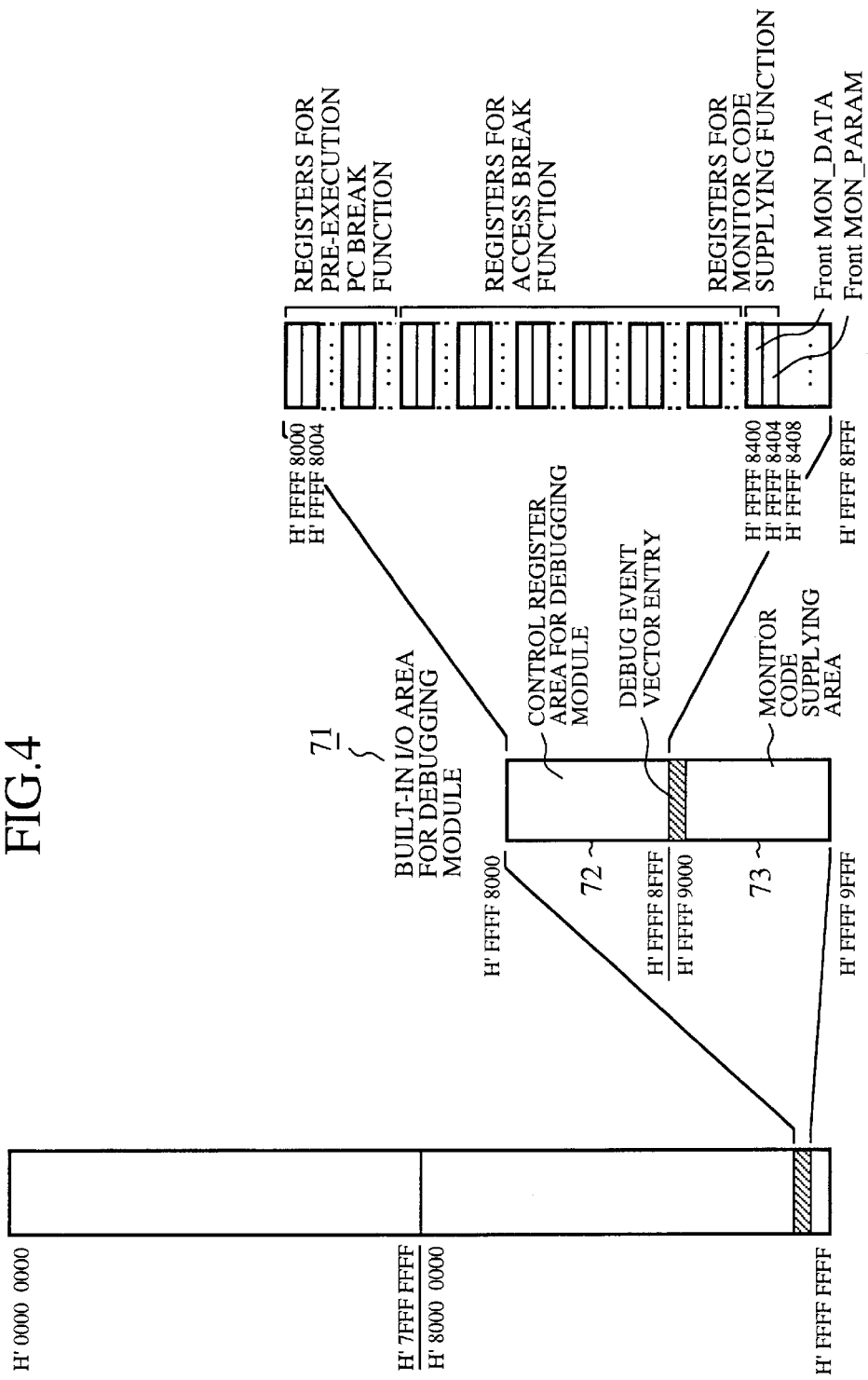
FIG. 4 is a diagram showing a debugging module memory area for use with the debugging module, which is mapped into a memory built in the microcomputer chip.

Referring next to FIG. 4, it illustrates a diagram showing a debugging module memory area for use with the debugging module, which is mapped into a memory built in the chip. In the figure, reference numeral 71 denotes a debugging module I/O area that ranges from FFFF8000 to FFFF9FFF in hex, numeral 72 denotes a debugging module control register area that ranges from FFFF8000 to FFFF8FFF in hex, in which a group of registers for use with the pre-execution PC function, a group of registers for use with the access break function, and a group of registers for use with the monitor code supplying function are located, and numeral 73 denotes a monitor code supplying area that ranges from FFFF9000 to FFFF9FFF in hex, via which the monitor code supplying function 66 can be accessed. When any fetching of an instruction from the monitor code supplying area is done, the instruction code can be fetched by way of the JTAG interface terminal 61 using the monitor code supplying function 66. The debug event vector entry that ranges from FFFF9000 to FFFF9003 in hex, which is included with the monitor code supplying area, is an area to which the CPU 53 branches when a debug event occurs.

Figure 5:
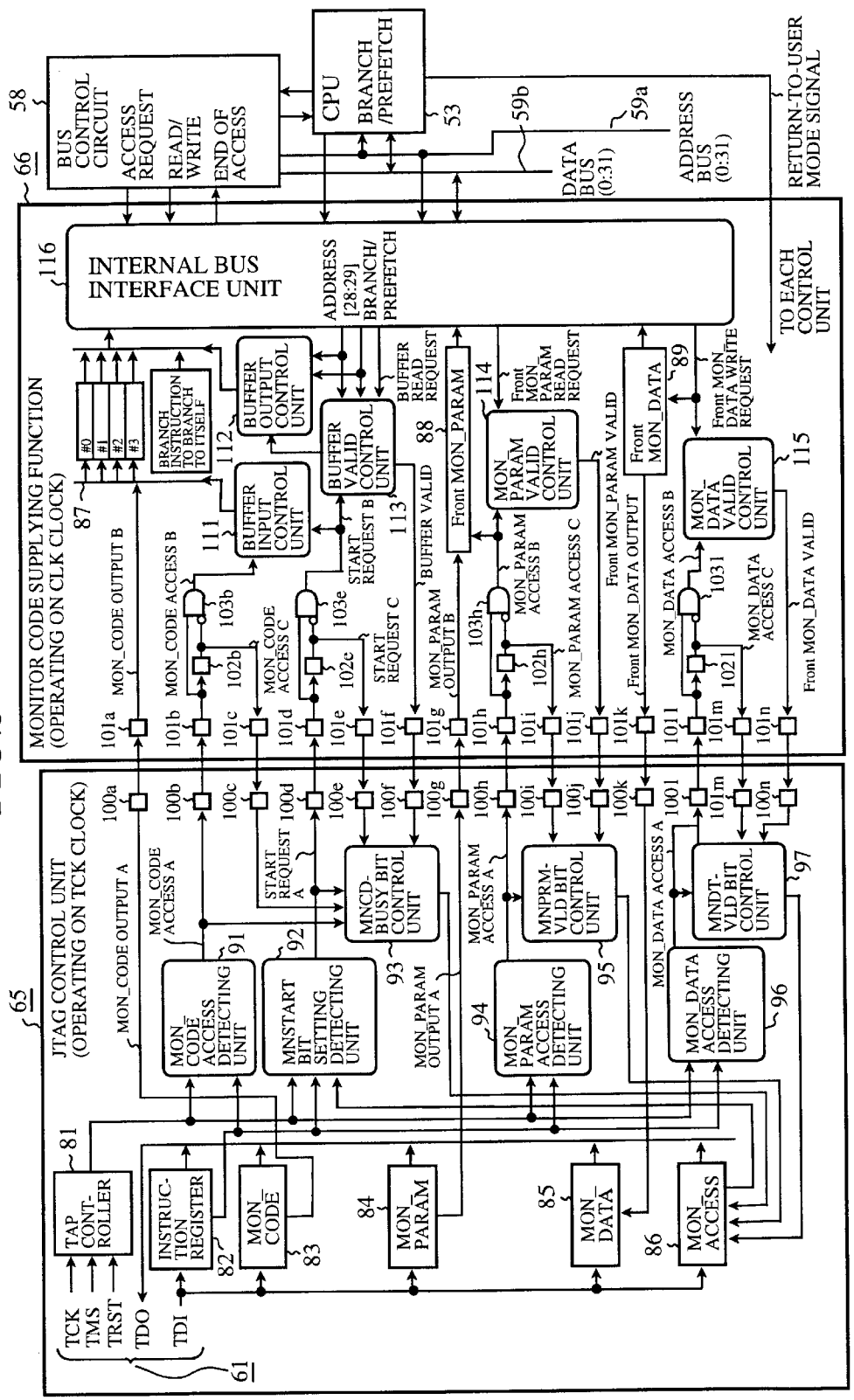
FIG. 5 is a diagram showing the detailed structure of a JTAG control unit and a monitor code supplying function of the microcomputer of the embodiment of the present invention.

Referring next to FIG. 5, it illustrates a diagram showing the detailed structure of the JTAG control unit and the monitor code supplying function. The JTAG control unit 65 mainly supplies one or more instruction codes from the debugging tool 52, by way of the JTAG interface (or serial interface) 61, to the CPU 53, in cooperation with the monitor code supplying function 66 when a debug event occurs, the monitor code supplying function 66 branches to the address FFFF9000 in hex which is the head portion of the monitor code supply area 73 as shown in FIG. 4, and the CPU 53 then executes one or more instruction codes supplied from the monitor code supplying function 66.

Both the debugging tool 52 and the JTAG control unit 65 operate on a TCK clock, whereas both the CPU 53 and the monitor code supplying function 66 operate on a CLK clock. The JTAG control 65 performs the handshake with the monitor code supplying function 66 so that those components can work at any combination of the frequencies of the TCK and CLK clocks.

In the JTAG control unit 65, the TAP controller 81 can control accesses done by way of the JTAG interface 61. An instruction register 82 can determine which test is to be carried out using either one of a plurality of JTAG registers, which will be described below, included with the JTAG control unit.

The JTAG control unit 65 includes, as a JTAG register, a 32-bit MON_CODE register 83 to which an instruction code supplied from the debugging tool 52 is set when executing the monitor program (i.e., debug program) by way of the JTAG interface 61 in the debugging mode. The instruction code set to the MON_CODE register 83 is then transferred to an instruction code buffer 87 of the monitor code supplying function 66. At that time, an input pointer specifying the next entry of the instruction code buffer 87 in which an instruction code is to be stored next is automatically incremented.

The JTAG control unit 65 further includes, as a JTAG register, a 32-bit MON_PARAM register 84 that serves as an interface to enable the debugging tool 52 to furnish parameters to the CPU when the CPU executes the monitor program by way of the JTAG interface 61 in the debugging mode. When the debugging tool 52 writes parameters into the MON_PARAM register 84 by way of the JTAG interface 61, these parameters are further transferred to a FrontMON_PARAM register 88 included with the monitor code supplying function 66, so that the monitor program can read the parameters using a load instruction.

In addition, the JTAG control unit 65 includes, as a JTAG register, a 32-bit MON_DATA register that serves as an interface to enable the CPU to furnish execution results to the debugging tool 52 when executing the monitor program by way of the JTAG interface 61 in the debugging mode. When the monitor program writes execution results into a FrontMON_DATA register 89 included with the monitor code supplying function 66 using a store instruction, the execution results are then transferred to the MON_DATA register 85, so that the debugging tool 52 can read them from the MON_DATA register 85 by way of the JTAG interface 61.

Furthermore, the JTAG control unit 65 includes, as a JTAG register, a 4-bit MON_ACCESS register 86 for setting and storing access control information when the CPU 53 executes the monitor program supplied thereto, by way of the JTAG interface 61 in the debugging tool 52 in the debugging mode. The function of each of the 4 bits of the MON_ACCESS register 86 is as follows:

(a) Bit 0, which is called MNSTART bit, is a bit to trigger the supply of the monitor code (Bit 0 is readable and writable).
When Bit 0 is set to 1: one or more instruction codes have been already set;
When Bit 0 is set to 0: any instruction code has not been set yet.
Bit 0 set to "1" indicates that one or more valid instruction codes have already been set to the instruction code buffer 87. The JTAG control unit can receive a request for an instruction fetching from the monitor code supplying function 66.

(b) Bit 1, which is called MNDTVLD bit, is a bit to indicate whether the contents of the FrontMON_DATA register are valid or invalid. Bit 1 is a read-only bit.
When Bit 1 is set to 1: the contents of the FrontMON_DATA register are valid (the data has already been written into the FrontMON_DATA register 89 and the contents of the MON_DATA register 85 have not been referred yet).
When Bit 1 is set to 0: the contents of the FrontMON_DATA register are invalid (data has not been written into the FrontMON_DATA register 89 yet, or the contents of the MON_DATA register 85 have already been referred).
When data is written into the FrontMON_DATA register 89, Bit 1 is set to "1". Bit 1 is cleared when one of the following conditions is satisfied.
(1) when the MON_DATA register 85 is accessed;
(2) when the RTE instruction is executed in the debugging mode;
(3) when the debug control unit is reset (the debugging process is reset).

(c) Bit 2, which is called MNPRMVLD bit, is a bit to indicate whether the contents of the FrontMON_PARAM register are valid or invalid. Bit 2 is a read-only bit.
When Bit 2 is set to 1: the contents of the FrontMON_PARAM register are valid (while data has already been set to the MON_DATA register 84, the contents of the FrontMON_PARAM register 88 have not been referred yet).
When Bit 2 is set to 0: the contents of the FrontMON_PARAM register are invalid (data has not been set to the MON_DATA register 84 yet, or the contents of the FrontMON_PARAM register 88 have already been referred).
When data is written into the FrontMON_PARAM register 88, Bit 2 is set to "1". Bit 2 is cleared when one of the following conditions is satisfied.
(1) when data is read out of the FrontMON_PARAM register 88;
(2) when the RTE instruction is executed in the debugging mode;
(3) when the debug control unit is reset (the debugging process is reset).

(d) Bit 3, which is called MNCDBUSY bit, is a bit to indicate whether or not the MON_CODE register is busy. Bit 3 is a read-only bit.
When Bit 3 is set to 1: it is impossible to set data to the MON_CODE register.
When Bit 3 is set to 0: it is possible to set data to the MON_CODE register.
Bit 3 is a bit indicating whether or not the next instruction code can be set to the MON_CODE register 83. Bit 3 represents one of the following two events.
(1) Bit 3 set to "1" indicates that the instruction code is being transferred from the MON_CODE register 83 to the instruction code buffer 87. Bit 3 set to "0" indicates that the transfer has been completed.
(2) Bit 3 set to "1" indicates that there is an instruction code that has not been fetched by the instruction code buffer 87 yet. Bit 3 set to "0" indicates that there is no not-yet-fetched instruction code.

Bit 3 is set to "1" when one of the following conditions is satisfied.
   (1) when the MON_CODE register 83 is accessed;
   (2) when the MNSTART bit is set to "1".

In contrast, Bit 3 is cleared when one of the following conditions is satisfied.
   (1) when a value written into the MON_CODE register 83 is transferred to the instruction code buffer 87;
   (2) when all instructions stored in the instruction code buffer 87 have been fetched by the CPU 53 (refer to Note described below);
   (3) when the RTE instruction is executed in the debugging mode;
   (4) when the debug control unit is reset (the debugging process is reset).

(Note)

It can be determined that all instructions stored in the instruction code buffer 87 have already been fetched by the CPU 53 when a second instruction-fetching request for fetching of the leading word of the instruction code buffer 87 is made. For example, when the second word of the instruction code buffer 87 is a branch instruction, it is determined that all instructions stored in the instruction code buffer 87 have already been fetched by the CPU 53 once an instruction-fetching request for fetching of a destination instruction code to which the CPU branches according to the second word is made, even though more instruction codes are set to the third and fourth words of the instruction code buffer 87. To this end, it is assumed that a limitation that the branch destination must be the starting address of the instruction code buffer 87 when the monitor code supplying function 66 branches is imposed on the debugging tool 52. In other words, the address of the branch destination specified by a branch instruction, which is set to the MON_CODE register 83 by the debugging tool 52, must be the address on the four word boundary (i.e., the four lower address bits [28:31] are "0000"). The limitation ensures that an instruction-fetching request for the first word of the instruction code buffer 87 is made when the monitor code supplying function 66 branches.

The instruction code buffer 87 included with the monitor code supplying function 66 consists of four words. The contents of the MON_CODE register 83 of the JTAG control unit 65 can be transferred to the instruction code buffer 87. The instruction code buffer 87 is mapped into the monitor code supplying area at addresses that range from FFFF9000 to FFFF9FFF in hex, as shown in FIG. 4. Which word of the instruction code buffer 87 is selected is determined by the two lower bits [28:29] of the address.

The FrontMON_PARAM register 88 included with the monitor code supplying function 66 is a 32-bit register for transferring parameters supplied from the debugging tool 52 to the CPU 53. The contents of the MON_PARAM register 84 included with the JTAG control unit 65 can be transferred to the FrontMON_PARAM register 88.

The FrontMON_DATA register 89 included with the monitor code supplying function 66 is a 32-bit register for transferring execution results from the CPU 53 to the debugging tool 52. The contents of the FrontMON_DATA register 89 can be transferred to the MON_DATA register 85 included with the JTAG control unit 65.

The JTAG control unit 65 further includes a MON_CODE ACCESS detecting unit 91 for generating a MON_CODE access A signal at state "1" when the MON_CODE register 83 is accessed, and, responsive to a MON_CODE access C signal from the monitor code supplying function 66, for generating a MON_CODE access A signal at state "0" upon a rising edge of the MON_CODE access C signal. The generated MON_CODE access A signal is delivered to both a MNCDBUSY bit control unit 93 and the monitor code supplying function 66.

In addition, the JTAG control unit 65 includes an MNSTART bit setting detecting unit 92 for generating a start request A signal at state "1" when the MNSTART bit of the MON_ACCESS register 86 is set to "1", and, responsive to a start request C signal from the monitor code supplying function 66, for generating a start request A signal at state "0" upon a rising edge of the start request C signal. The generated start request A signal is delivered to both the MNCDBUSY bit control unit 93 and the monitor code supplying function 66.

The MNCDBUSY bit control unit 93 clears the MNCDBUSY bit of the MON_ACCESS register 86 to zero in response to a debugging module reset signal to reset the debugging module 54, which is applied thereto from the debugging tool 52. When any access to the MON_CODE register 83 is detected or the MNSTART bit of the MON_ACCESS register 86 is set to "1", the MNCDBUSY bit control unit 93 sets the MNCDBUSY bit to "1". When the MON_CODE access C signal becomes state "1" or the start request C signal becomes "1", the MNCDBUSY bit control unit 93 sets the MNCDBUSY bit to the value of a buffer valid signal. Otherwise, the MNCDBUSY bit control unit 93 holds the current value of the MNCDBUSY bit.

In addition, the JTAG control unit 65 includes a MON_PARAM access detecting unit 94 for generating a MON_PARAM access A signal at state "1" when the MON_PARAM register 84 is accessed, and, responsive to a MON_PARAM access C signal from the monitor code supplying function 66, for generating a MON_PARAM access A signal at state "0" upon a rising edge of the MON_PARAM access C signal. The generated MON_PARAM access A signal is delivered to both an MNPRMVLD bit control unit 95 and the monitor code supplying function 66.

The MNPRMVLD bit control unit 95 clears the MNPRMVLD bit of the MON_ACCESS register 86 to zero in response to the debugging module reset signal applied thereto. When any access to the MON_PARAM register 84 is detected, the MNPRMVLD bit control unit 95 sets the MNPRMVLD bit to "1". When the MON_PARAM access C signal becomes state "1", the MNPRMVLD bit control unit 95 sets the MNPRMVLD bit to the value of a FrontMON_PARAM valid signal. Otherwise, the MNPRMVLD bit control unit 95 holds the current value of the MNPRMVLD bit.

In addition, the JTAG control unit 65 includes a MON_DATA access detecting unit 96 for generating a MON_DATA access A signal at state "1" when the MON_DATA register 85 is accessed, and, responsive to a MON_DATA access C signal from the monitor code supplying function 66, for generating a MON_DATA access A signal at state "0" upon a rising edge of the MON_DATA access C signal. The generated MON_DATA access A signal is delivered to both an MNDTVLD bit control unit 97 and the monitor code supplying function 66.

The MNDTVLD bit control unit 97 clears the MNDTVLD bit of the MON_ACCESS register 86 to zero in response to the debugging module reset signal applied thereto. When any access to the MON_DATA register 85 is detected, the MNDTVLD bit control unit 97 sets the MNDTVLD bit to "1". When the MON_DATA access C signal becomes state "1", the MNDTVLD bit control unit 97 sets the MNDTVLD bit to the value of a FrontMON_DATA valid signal. Otherwise, the MNDTVLD bit control unit 97 holds the current value of the MNDTVLD bit.

Furthermore, the JTAG control unit 65 includes a plurality of flip-flops 100a to 100n, each for sampling data applied thereto upon rising edges of the TCK clock.

The monitor code supplying function 66 further includes a plurality of flip-flops 101a to 101n, each for sampling data applied thereto upon rising edges of the CLK clock. Each connection between the JTAG control unit 65 and the monitor code supplying function 66 includes two stages of flip-flops 100a and 101a, . . . , or 100n and 101n, thus converting a signal synchronized with the TCK clock into an equivalent signal synchronized with the CLK clock, and reversely converting a signal synchronized with the CLK clock into an equivalent signal synchronized with the TCK clock.

The monitor code supplying function 66 further includes a flip-flop 102b and an AND gate 103b, which are intended for processing MON_CODE access signals. The AND gate 103b furnishes a MON_CODE access B signal. The flip-flop 102b furnishes the MON_CODE access C signal, by way of the flip-flops 101c and 100c, to the JTAG control unit 65.

In addition, the monitor code supplying function 66 includes a flip-flop 102d and an AND gate 103d, which are intended for processing start request signals. The AND gate 103d furnishes a start request B signal. The flip-flop 102d furnishes the start request C signal, by way of the flip-flops 101e and 100e, to the JTAG control unit 65.

The monitor code supplying function 66 further includes a flip-flop 102h and an AND gate 103h, which are intended for processing MON_PARAM access signals. The AND gate 103h furnishes a MON_PARAM access B signal. The flip-flop 102h furnishes the MON_PARAM access C signal, by way of the flip-flops 101i and 100i, to the JTAG control unit 65.

In addition, the monitor code supplying function 66 includes a flip-flop 102l and an AND gate 103l, which are intended for processing MON_DATA access signals. The AND gate 103l furnishes a MON_DATA access B signal. The flip-flop 102l furnishes the MON_DATA access C signal, by way of the flip-flops 101m and 100m, to the JTAG control unit 65.

The monitor code supplying function 66 further includes a buffer input control unit 111 for furnishing a MON_CODE output B signal to the instruction code buffer 87 when the MON_CODE access B signal is at state "1". To which entry within the instruction code buffer the MON_CODE output B signal is input is determined according to the value (0, 1, 2, or 3) of the input pointer. The input pointer is cleared to zero when either the debugging module reset signal or the start request B signal becomes state "1". The input pointer is incremented by one every time the MON_CODE access B signal becomes state "1". Otherwise, the value of the input pointer is held.

In addition, the monitor code supplying function 66 includes a buffer output control unit 112 for determining from which entry within the instruction code buffer 87 an instruction code is to be furnished next. The buffer output control unit 112 selects one entry from which an instruction code is to be furnished next according to the two lower bits [28:29] of the address. When the two lower bits are "00", the buffer output control unit 112 selects the first entry #0. When the two lower bits are "01", the buffer output control unit 112 selects the second entry #1. When the two lower bits are "10", the buffer output control unit 112 selects the third entry #2. When the two lower bits are "11", the buffer output control unit 112 selects the fourth entry #3. However, there are exceptions to these rules. When the two lower bits [28:29] are "00" and the buffer valid signal indicates that the contents of the buffer are invalid or when the two lower bits [28:29] are "00" and a branch/prefetch signal is at state "0" (in this case, a prefetching process is selected), the buffer output control unit 112 furnishes a branch instruction to branch to itself.

The monitor code supplying function 66 further includes a buffer valid control unit 113 for generating the buffer valid signal indicating whether the contents of the instruction code buffer 87 are valid (in this case, the buffer valid signal is at state 1) or invalid (in this case, the buffer valid signal is at state 0). The buffer valid control unit 113 clears the buffer valid signal to zero when either the debugging module reset signal or the return-to-user mode signal becomes state "1". In addition, the buffer valid control unit 113 clears the buffer valid signal to zero when a buffer read request signal is at state "1", the two lower address bits [28:29] are "00", and the branch/prefetch signal is at state "1" (in this case, a branch process is selected). In contrast, when the start request B signal becomes state "1", the buffer valid control unit 113 makes the buffer valid signal state "1". Otherwise, the buffer valid control unit 113 holds the current value of the buffer valid signal.

In addition, the monitor code supplying function 66 includes a MON_PARAM valid control unit 114 for generating a FrontMON_PARAM valid signal indicating whether the contents of the FrontMON_PARAM register 88 are valid (in this case, the FrontMON_PARAM valid signal is at state 1) or invalid (in this case, the FrontMON_PARAM valid signal is at state 0). The MON_PARAM valid control unit 114 clears the FrontMON_PARAM valid signal to zero when either of the debugging module reset signal, the return-to-user mode signal, and the FrontMON_PARAM read request signal becomes state "1". The MON_PARAM valid control unit 114 makes the FrontMON_PARAM valid signal state "1", when the MON_PARAM access B signal becomes state "1". Otherwise, the FrontMON_PARAM valid control unit 114 holds the current value of the FrontMON_PARAM valid signal.

The monitor code supplying function 66 further includes a MON_DATA valid control unit 115 for generating a FrontMON_DATA valid signal indicating whether the contents of the FrontMON_DATA register 89 are valid (in this case, the FrontMON_DATA valid signal is at state 1) or invalid (in this case, the FrontMON_DATA valid signal is at state 0). The MON_DATA valid control unit 115 clears the FrontMON_DATA valid signal to zero when either of the debugging module reset signal, the return-to-user mode signal, and the MON_DATA access B signal becomes state "1". The MON_DATA valid control unit 115 makes the FrontMON_DATA valid signal state "1", when a FrontMON_DATA write request signal becomes state "1". Otherwise, the MON_DATA valid control unit 115 holds the current value of the FrontMON_DATA valid signal.

In addition, the monitor code supplying function 66 includes an internal bus interface 116 for controlling accesses to the internal buses by the monitor code supplying function 66. The internal bus interface 116 includes the following functions.

(a) Control of internal bus protocols;

This is a function of receiving an access request signal and a read/write request signal applied thereto from the bus control circuit 58, and returning an access completion signal indicating the completion of the access.

(b) Output control;
   This is a function of sending out output data from the instruction code buffer 87 and output data from the FrontMON_PARAM register 88 onto a data bus 59*b*.
(c) Input control;
   This is a function of receiving a value on the data bus 59*b*, and furnishing the value to the FrontMON_DATA register 89.
(d) Decoding of addresses;
   This is a function of generating a buffer read request signal indicating a read request for reading an instruction code from the instruction code buffer 87, a FrontMON_DATA write request signal indicating a write request for writing data into the FrontMON_DATA register 89, and a FrontMON_PARAM read request signal indicating a read request for reading data from the FrontMON_PARAM register 88.

Next, a description will be made as to the operation of the microcomputer according to the present invention with reference to FIG. 5.

(1) Setting of instruction codes to the instruction code buffer;
   A. Transfer of instruction codes from the MON_CODE register to the instruction code buffer;
      ① Writing of an instruction code into the MON_CODE register;
         The debugging tool 52 can serially write an instruction codes into the MON_CODE register 83 by way of the JTAG interface 61.
         The MON_CODE output A signal furnished by the MON_CODE register 83 is delivered, by way of the flip-flops 100*a* and 101*a*, to the monitor code supplying function 66,,and then becomes the MON_CODE output B signal synchronized with the CLK clock.
      ② Detection of an access to the MON_CODE register;
         The MON_CODE access detecting unit 91 detects an access to the MON_CODE register 83 from the value of the instruction register 82 and the status of the TAP controller 81. The MON_CODE access detecting unit 91 then makes the MON_CODE access A signal state "1".
      ③ Writing of the instruction code into the instruction code buffer;
   The MON_CODE access A signal is delivered, by way of the flip-flops 100*b* and 101*b*, to the monitor code supplying function 66, and is then converted into an equivalent signal synchronized with the CLK clock. When the MON_CODE access A signal makes a "0" to "1" transition, the flip-flop 102*b* and the AND gate 103*b* generates the MON_CODE access B signal at state "1" having a duration corresponding to one clock cycle.
         The buffer input control unit 111 then writes the value of the MON_CODE output B signal into the instruction code buffer 87 while the MON_CODE access B signal is at state "1". The entry of the instruction code buffer 87, into which the value of the MON_CODE output B signal is written, is the one specified by the value (0, 1, 2 or 3) of the input pointer. Initially, the input pointer has a value of "0". After that, every time an instruction code is written into the instruction code buffer 87, the input pointer is incremented by one.
   By repeating the above processes, entries set in the instruction code buffer 87 are possible to a maximum of four instruction codes. The debugging tool 52 can determine whether to write the next instruction code into the MON_CODE register 83 from the value of the MNCDBUSY bit of the MON_ACCESS register 86 when setting a plurality of instruction codes into the instruction code buffer 87. After the contents of the MON_CODE register 83 have been transferred to the instruction code buffer 87, the MNCDBUSY bit control unit 93 makes the MNCDBUSY bit state "0", which indicates that the debugging tool 52 is allowed to set the next instruction code into the MON_CODE register 83. The control of the MNCDBUSY bit is performed as follows:
   B. Handshaking with the debugging tool when setting an instruction code into the MON_CODE register;
      ① Setting of the MNCDBUSY bit to "1" when the debugging tool sets an instruction code to the MON_CODE register;
         The MNCDBUSY bit control unit 93 sets the MNCDBUSY bit of the MON_ACCESS register 86 to "1" when the MON_CODE access A signal becomes state "1".
         The MNCDBUSY bit set to "1" indicates that the instruction code set to the MON_CODE register 83 has not been transferred to the instruction code buffer 87 yet.
         After the debugging tool 52 has set the instruction code to the MON_CODE register 83, it accesses the MON_ACCESS register 86 to check the value of the MNCDBUSY bit. The debugging tool 52 does not set the next instruction code to the MON_CODE register 83 while the MNCDBUSY bit is at state "1".
      ② Clearing of the MNCDBUSY bit to zero at the completion of the transfer of the instruction code to the instruction code buffer;
         The monitor code supplying function 66 furnishes the MON_CODE access C signal, which has passed through the flip-flop 102*b*, indicating that the MON_CODE access A signal has been delivered to the monitor code supplying function 66, to the JTAG control unit 65.
         When the MON_CODE access C signal becomes state "1", the MNCDBUSY bit control unit 93 controls the MON_ACCESS register 86 so that the value of the buffer valid signal is set to the MNCDBUSY bit of the MON_ACCESS register 86. Since the buffer valid signal is at state "0" when setting an instruction code to the instruction code buffer, the MNCDBUSY bit is actually cleared to "0".
         The MNCDBUSY bit set to "0" indicates that the instruction code set to the MON_CODE register 83 has already been transferred to the instruction code buffer 87.
         After the debugging tool 52 has set the instruction code to the MON_CODE register 83, it accesses the MON_ACCESS register 86 to check the value of the MNCDBUSY bit. When the MNCDBUSY bit becomes state "0", the debugging tool 52 sets the next instruction code to the MON_CODE register 83.
         The forcedly setting of the MNCDBUSY bit to "1" in the above B-① process and, after that, setting of the MNCDBUSY bit to the value of the buffer valid signal in response to the MON_CODE access C signal are measures to make sure that the debugging tool 52 doesn't set the next instruction code to the MON_CODE register 83 before the previous instruction code has been transferred to the instruction code buffer 87 in the case that the CLK clock speed is very low as compared with the TCK clock speed. When the CLK clock speed is very low as compared with the TCK clock speed, the time required for transferring the contents of the MON_CODE register 83 to the instruction code buffer 87 is increased. To this end, the MNCDBUSY bit control unit 93 determines whether the contents of the MON_CODE register 83 have been transferred to the instruction code buffer 87 from the MON_CODE access C signal from the monitor code supplying function 66. While the MNCDBUSY bit control unit 93 of the JTAG control unit 65 does not receive the MON_CODE access C signal from the monitor code supplying function 66, it determines that the contents of the MON_CODE register 83 has not been transferred to the instruction code buffer 87 yet, and then forcedly sets the MNCDBUSY bit to "1" so as to prevent the debugging tool 52 from setting the next instruction code to the MON_CODE register 83.

Figure 6:
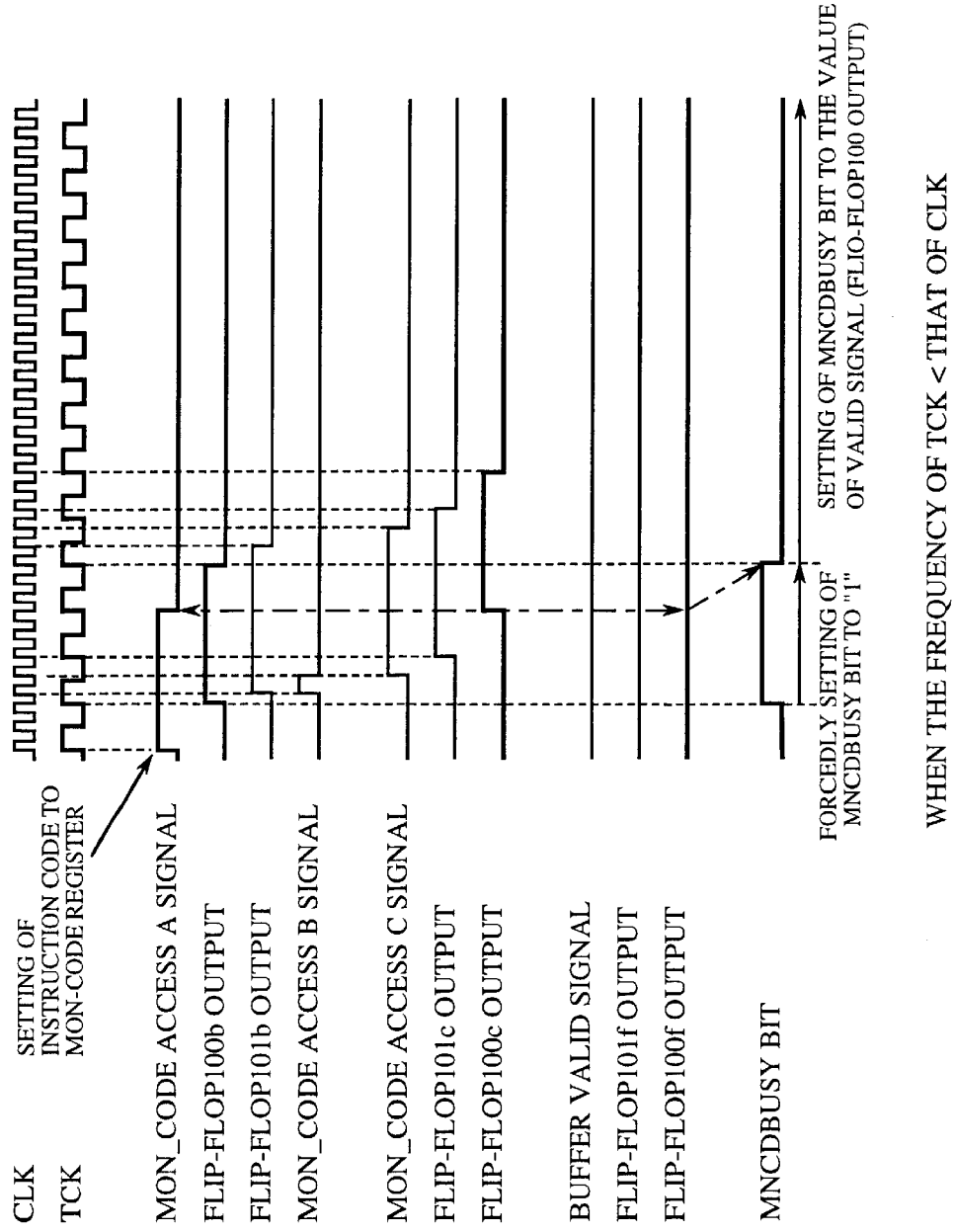
FIG. 6 is a timing chart showing various signals generated in a case where the frequency of the TCK clock< that of the CLK clock when setting one or more instruction codes to an instruction code buffer of the monitor code supplying function.
Figure 7:
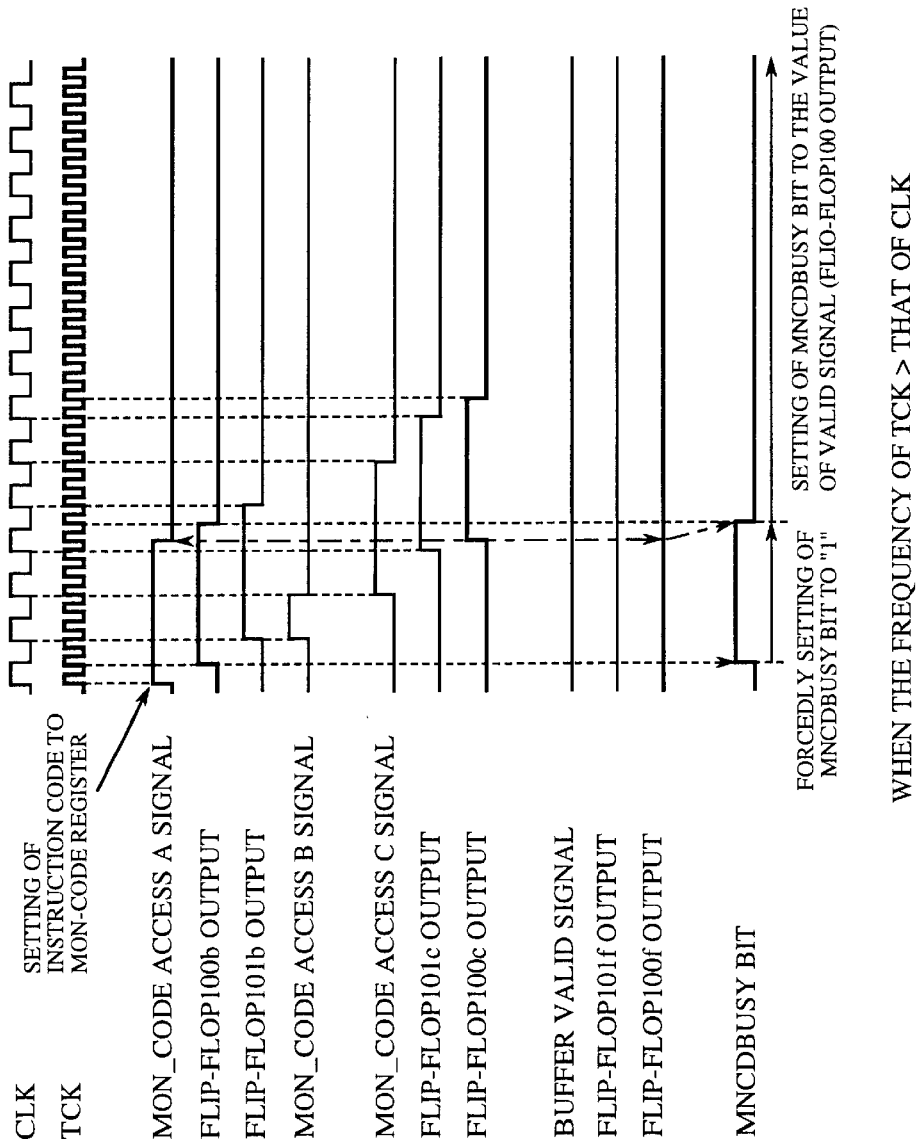
FIG. 7 is a timing chart showing various signals generated in a case where the frequency of the TCK clock> that of the CLK clock when setting one or more instruction codes to the instruction code buffer.

FIG. 6 is a timing chart showing various signals generated in a case where the frequency of the TCK clock<that of the CLK clock when setting one or more instruction codes to the instruction code buffer. FIG. 7 is a timing chart showing various signals generated in a case where the frequency of the TCK clock>that of the CLK clock when setting one or more instruction codes to the instruction code buffer.

(2) Execution of each instruction code by the CPU;
  A. Execution of each instruction code set to the instruction code buffer;
  ① Writing of "1" into the MNSTART bit;
    After completing the transfer of one or more instruction codes to the instruction code buffer 87 according to the above-mentioned process (1), the debugging tool 52 writes "1" into the MNSTART bit of the MON_ACCESS register 86.
  ② Detection of setting of the MNSTART bit to "1";
    The MNSTART bit setting detection unit 92 detects the setting of the MNSTART bit of the MON_ACCESS register 86 to "1" from the value of the instruction register 82, the status of the TAP controller 81, and the value of the MNSTART bit of the MON_ACCESS register 86. The MNSTART bit setting detection unit 92 then makes the start request A signal state "1".
  ③ Enabling the CPU to read the contents of the instruction code buffer;
    The start request A signal is delivered, by way of the flip-flops 100d and 101d, to the monitor code supplying function 66, and is then converted into an equivalent signal synchronized with the CLK clock. When the start request A signal makes a "0" to "1" transition, the flip-flop 102d and the AND gate 103d generate the start request B signal at state "1" having a duration corresponding to one clock cycle.
    The buffer input control unit 111 initializes the input pointer to "0" when the start request B signal becomes state "1". As a result, when the debugging tool 52 sets one or more new instruction codes to the instruction code buffer 87 after the CPU 53 has finished fetching the previous set of one or more instruction codes, the first instruction code of the new set of one or more instruction codes is set to the entry #0 of the instruction code buffer 87.
    When the start request B signal becomes state "1", the buffer valid control unit 113 makes the buffer valid signal state "1", indicating that the plurality of instruction codes written into the instruction code buffer 87 can be read.
  ④ Control of the output of the instruction code buffer;
    The buffer output control unit 112 determines one entry of the instruction code buffer 87 from which an instruction code is to be furnished to the CPU next.
    The buffer output control unit 112 selects the entry according to the two lower address bits [28:29]. When the two lower address bits are "00", the buffer output control unit 112 selects the first entry #0. When the two lower address bits are "01", the buffer output control unit 112 selects the second entry #1. When the two lower address bits are "10", the buffer output control unit 112 selects the third entry #2. When the two lower address bits are "11", the buffer output control unit 112 selects the fourth entry #3. However, there are exceptions to these rules.
    When the two lower address bits [28:29] are "00" and the buffer valid signal is at state "0" or when the two lower address bits [28:29] are "00" and the branch/prefetch signal is at state "0" (in this case, a prefetching process is selected), the buffer output control unit 112 furnishes the code of a branch instruction to branch to itself to the internal bus interface 116 in response to an instruction-fetching request from the CPU 53.
    The description will be directed to a detailed explanation of the instruction-fetching request from the CPU 53.
  ④-a Instruction-fetching request made by the CPU when a debug event occurs;
    When a debug event occurs, the CPU 53 branches to the address FFFF9000 in hex. The CPU 53 then furnishes an instruction-fetching request to the bus control circuit 58. When the bus control circuit 58 receives the request from the CPU 53, the CPU 53 generates and furnishes the following values to the monitor code supplying function 66:
      a. the value on the address bus: FFFF9000 in hex; the value of the branch/prefetch signal: "1" (in this case, a branch process is selected).
        On the other hand, the bus control circuit 58 generates and furnishes the following values to the monitor code supplying function 66:
      b. the value of the access request signal: "1"; the value of the read/write signal: "1" (in this case, a reading process is selected).
  ④-b Process performed when instruction codes have not been set to the instruction code buffer yet;
    The internal bus interface unit 116 of the monitor code supplying function 66 decodes the address and then determines that the address is associated with a read request for the instruction code buffer 87. As a result, the internal bus interface unit 116 makes the buffer read request signal state "1".
    When the buffer valid signal is at state "0", the output of the instruction code buffer 87 is a "branch instruction to branch to itself". The internal bus interface 116 furnishes the following signals to the bus control circuit 58:
      a. the branch instruction to branch to itself by way of the data bus;

b. the access completion signal at state "0".

The CPU 53 then receives the branch instruction to branch to itself.

④-c Prefetching of an instruction code;

The CPU 53 continuously furnishes an instruction-fetching request to fetch an instruction at the address FFFF9004 in hex to the bus control unit 80 in order to prefetch the instruction. When the bus control unit 58 receives the request form the CPU 53, the CPU 53 generates the following signals:

a. the signal on the address bus: FFFF9004 in hex;

b. the branch/prefetch signal: "0" (in this case, a prefetching process is selected).

Simultaneously, the bus control circuit 58 generates the following signals:

a. the access request signal: "1";

b. the read/write signal: "1" (in this case, a reading process is selected).

When the instruction-fetching request is made, the monitor code supplying function 66 performs the same actions as described in ④-b. In this case, since the two lower address bits [28:29] are "01", the buffer output control unit 112 selects the second entry #1 of the instruction code buffer 87 and therefore sends out the contents of the second entry #1 onto the data bus 59*b*. The CPU 53 thus receives the instruction on the data bus 59*b*.

In this manner, when further instruction-prefetching requests to prefetch instructions at the addresses FFFF9008 and FFFF900C in hex are made successively, the CPU 53 receives the values of the third and fourth entries #2 and #3 from the monitor code supplying function 66. After that, when an instruction-prefetching request to prefetch an instruction at the address FFFF9010 in hex is further made, the monitor code supplying function 66 generates and furnishes a "branch instruction to branch to itself" onto the data bus 59*b* in the same manner that it does in performing the process ④-b.

The CPU 53 repeatedly performs the instruction-prefetching process until it executes the "branch instruction to branch to itself" which it has received in performing the process ④-b. The number of times that instruction-prefetching requests are made varies according to the status of the CPU 53 and the conditions of the buses.

④-d Execution of a branch instruction to branch to itself;

When the CPU 53 executes a "branch instruction to branch to itself" applied thereto, it makes an instruction-fetching request to fetch an instruction at the address FFFF9000 in hex again, and then returns to the process ④-a. In this case, all the instruction codes that the CPU 53 has already received in the prefetching process ④-c are cancelled, so that the CPU 53 does not execute them.

In this manner, while the buffer valid signal generated in the monitor code supplying function 66 is not at state "1", the processes ④-a, ④-b, and ④-c are repeated. In the meantime, since every instruction-fetching request is serviced every time it is made, the internal buses can be used when something other than the CPU 53 makes a request.

④-e Process done when the buffer valid signal becomes state "1";

When the buffer valid signal becomes state "1" in performing the A-③ process, the monitor code supplying function 66 performs one of the following processes according to when the buffer valid signal becomes state "1", and the CPU 53 executes an instruction.

(a) When the buffer valid signal becomes state "1" before the CPU 53 branches to the address FFFF9000 in hex because of occurrence of a debug event, the monitor code supplying function 66 generates and furnishes the following signals:

a. the signal on the data bus: the value of the first entry #0;

b. the access completion signal: state "1".

The CPU 53 then executes the instruction stored in the entry #0 and, after that, sequentially fetches instructions from the entries #1, #2, . . . , and executes these fetched instructions sequentially.

(b) When the buffer valid signal becomes state "1" during the process ④-c, the CPU successively performs the process ④-c and advances to the process ④-d. The CPU then executes the "branch instruction to branch to itself", and cancels all instructions which it has already received. As for the instruction-fetching associated with the execution of the "branch instruction to branch to itself", the monitor code supplying function 66 generates the following signals:

a. the signal on the data bus: the value of the first entry #0;

b. the access completion signal: state "1".

The CPU 53 then executes the instruction stored in the entry #0 and, after that, sequentially fetches instructions from the entries #1, #2, . . . , and executes these fetched instructions sequentially.

Next, the description will be directed to a function of preventing malfunctions from occurring when performing the instruction-prefetching process.

If an instruction-prefetching request to prefetch an instruction at the address FFFF9010 in hex is made during the process done when the buffer valid signal becomes state "1" during the process ④-c, the monitor code supplying function 66 is controlled to generate a "branch instruction to branch to itself" if the branch/prefetch signal is at state "0" (in this case, a prefetching process is selected). After the CPU 53 has executed the "branch instruction to branch to itself", it can execute one or more instructions stored in the instruction code buffer 87. Unless the monitor code supplying function 66 is controlled according to the value of the branch/prefetch signal, the monitor code supplying function 66 furnishes an instruction code stored in the first entry #0 of the instruction code buffer in response to an instruction-prefetching request to prefetch an instruction at the address FFFF9010 in hex. As a result, the CPU cancels the instruction code stored in the first entry #0, which the CPU actually has to execute, by executing the "branch instruction to branch to itself" which the CPU has received in performing the process ④-b. When fetching an instruction to which the CPU branches by the execution of the "branch instruction to branch to itself", the instruction code stored in the entry #0 has already been read. At that time, since the buffer valid signal is at state "0", the monitor code supplying function 66 furnishes a "branch instruction to branch to itself" and the instruction code stored in the entry #0 therefore remains to be executed.

⑤ Clearing of the buffer valid signal to "0";

When the buffer read request signal is at state "0", the two lower address bits are "00", and the branch/prefetch signal is at state "1" (in this case, a branch process is selected), the buffer valid signal is cleared to "0". This indicates that all the instruction codes stored in the instruction code buffer 87 have already been read by the CPU 53.

The CPU 53 can repeatedly use one or more instruction codes set to the instruction code buffer 87 a number of times without having to cause the debugging tool 52 to transfer the same instruction codes, by only writing "1" into the MNSTART bit of the MON_ACCESS register 86. In this manner, the CPU 53 can read the same instruction codes stored in the instruction code buffer 87 a plurality of number of times, thus saving some work required for setting the same instruction codes to the instruction code buffer 87.

B. Control of the handshake with the debugging tool by the CPU when executing an instruction;

① Setting of the MNCDBUSY bit to "1" in response to a start request from the debugging tool;

The MNCDBUSY bit control unit 93 sets the MNCDBUSY bit of the MON_ACCESS register 86 to "1" when the start request A signal becomes state "1".

The MNCDBUSY bit set to "1" indicates that the CPU 53 has not read all the instruction codes out of the instruction code buffer 87 yet.

The debugging tool 52 checks the value of the MNCDBUSY bit after the MNCDBUSY bit control unit has set the MNCDBUSY bit to "1". The debugging tool 52 does not set the next set of instruction codes to the instruction code buffer and make a start request.

② Clearing of the MNCDBUSY bit to "0" when the CPU completes the reading of the instruction code buffer;

The monitor code supplying function 66 furnishes the start request C signal indicating that the start request A signal has been delivered to the monitor code supplying function 66 to the JTAG control unit 65.

The MNCDBUSY bit control unit 93 controls the MON_ACCESS register 86 so that the MNCDBUSY bit of the MON_ACCESS register 86 is set to the value of the buffer valid signal when the start request C signal becomes state "1".

The buffer valid signal is generated by the buffer valid control unit 113 in the following manner.

a. When the debugging tool 52 sets the MNSTART bit to "1", the above processes A-② and ③ are performed to make the start request B signal become state "1". When the start request B signal becomes state "1", the buffer valid signal becomes state "1", indicating that valid instruction codes have already been set to the instruction code buffer 87.

b. After that, when the CPU 53 reads all the instruction codes from the instruction code buffer 87, the process A-⑤ is performed to clear the buffer valid signal to state "1", indicating that all the instruction codes stored in the instruction code buffer 87 have already been read by the CPU 53.

After the debugging tool 52 has set the MNSTART bit to "1", it accesses the MON_ACCESS register 86 to check the value of the MNCDBUSY bit. The MNCDBUSY bit at state "1" indicates that all the instruction codes stored in the instruction code buffer 87 have already been read by the CPU 53, and therefore the debugging tool 52 can set the next set of instruction codes to the instruction code buffer 87 and make a start request.

The forcedly setting of the MNCDBUSY bit to "1" in the above B-① process and, after that, setting of the MNCDBUSY bit to the value of the buffer valid signal in response to the start request C signal are measures to make sure that after setting the MNSTART bit to "1", the setting of the buffer valid signal to state "1" is done in time for checking the MNCDBUSY bit even though the CLK clock speed is very low as compared with the TCK clock speed. In other words, when the CLK clock speed is very low as compared with the TCK clock speed, there is a possibility that after setting the MNSTART bit to "1", the setting of the buffer valid signal to state "1" is delayed and hence is not in time for checking the MNCDBUSY bit. To avoid the problem, the setting of the MONCDBUSY bit to "1" is forcedly done at the same time that the setting of the MNSTART bit is done, and, after that, the MNCDBUSY bit control unit 93 controls the MNCDBUSY bit so that the MNCDBUSY bit reflects the value of the buffer valid signal after it is determined that the buffer valid signal precisely reflects whether the instruction code buffer 87 is valid or invalid.

Figure 8:
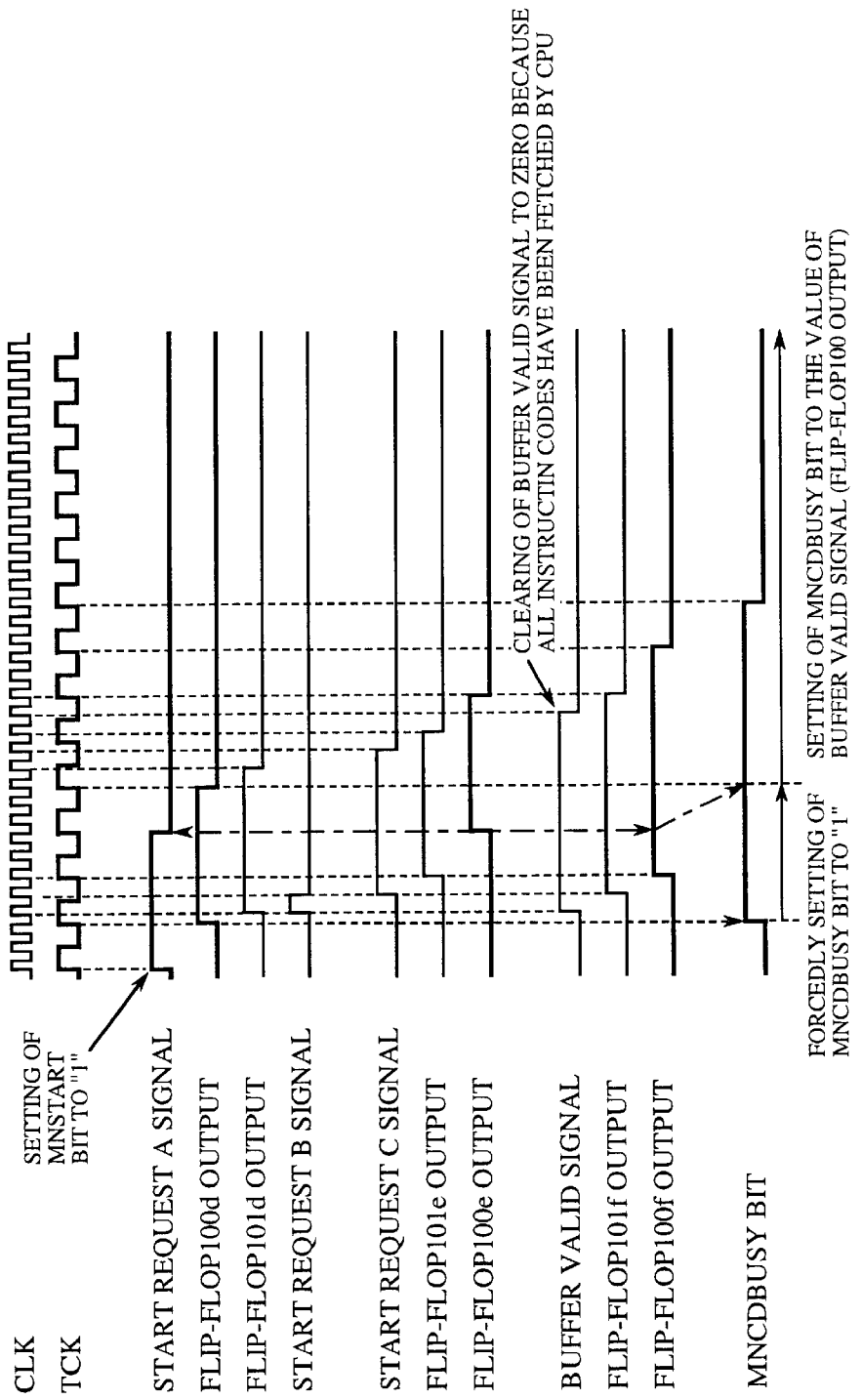
FIG. 8 is a timing chart showing various signals generated in a case where the frequency of the TCK clock<that of the CLK clock when the CPU executes an instruction code.
Figure 9:
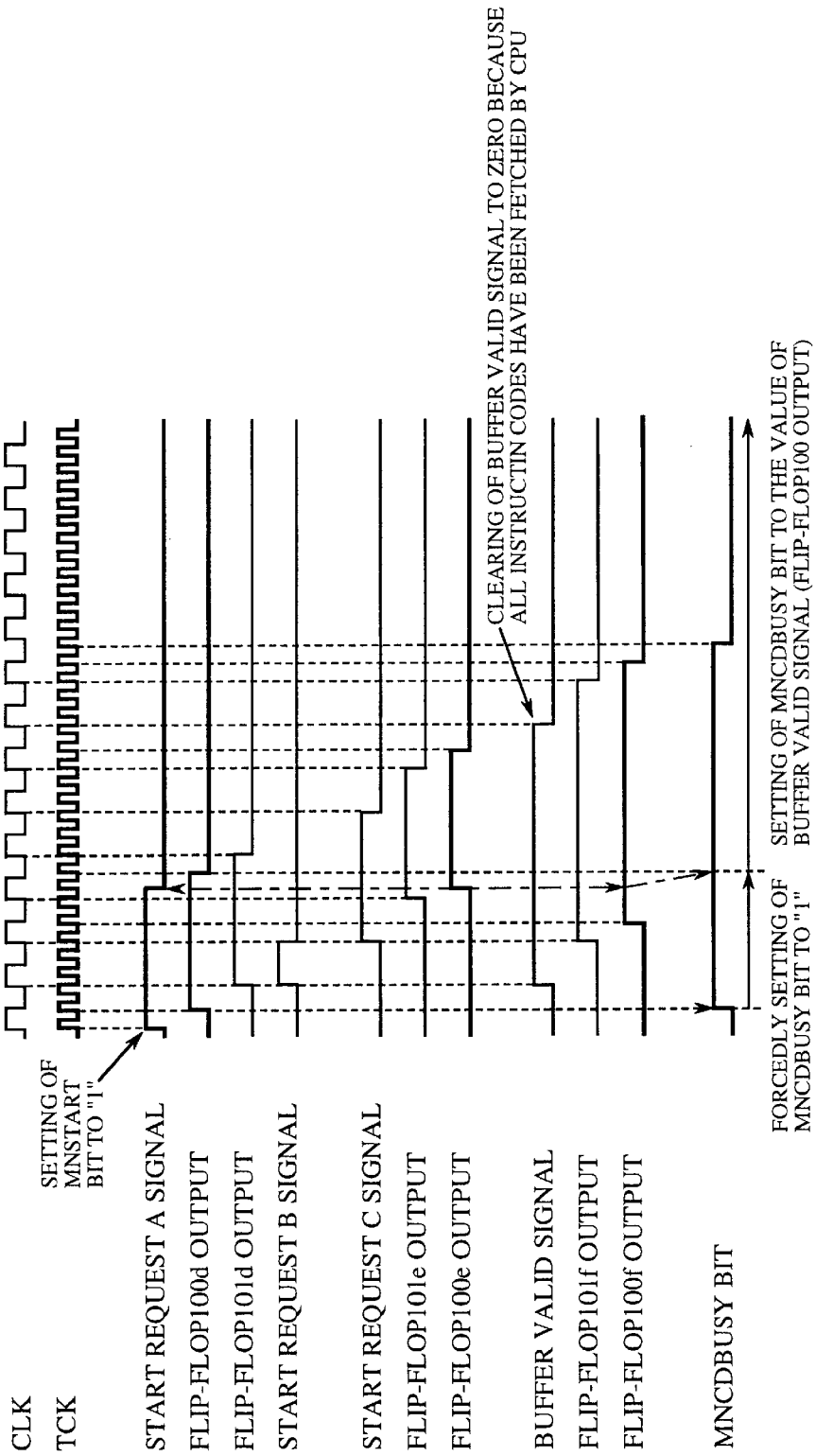
FIG. 9 is a timing chart showing various signals generated in a case where the frequency of the TCK clock>that of the CLK clock when the CPU executes an instruction code.

FIG. 8 is a timing chart showing various signals generated in a case where the frequency of the TCK clock< that of the CLK clock when the CPU executes an instruction code. FIG. 9 is a timing chart showing various signals generated in a case where the frequency of the TCK clock> that of the CLK clock when the CPU executes an instruction code.

(3) Processes associated with the MON_PARAM register;

The MON_PARAM register 84 is a register that serves as an interface via which data required for the execution of the monitor program is applied to the microcomputer from the debugging tool 52 located outside the chip. In order to use the MON_PARAM register 84, the monitor program including an instruction to read the contents of the FrontMON_PARAM register 88 is executed via the MON_CODE register 83. For example, it is effective for downloading of data into the built-in SRAM 56. The downloading function can be implemented by repeatedly performing a process of applying data to be downloaded, by way of the MON_PARAM register 84, to the microcomputer, and a process of making the CPU 53 execute the following program according to the above-mentioned processes (1) and (2).

a. LD R2, @R0: read data at the address (i.e., FFFF8004 in hex) specified by the register 0;

b. ST R2,@R1: write the contents of the register 2 into the address (i.e., download destination) specified by the register 1;

c. ADD R1,#4: add 4 to the contents of the register 1;

d. BRA: branch to the starting address of the instruction buffer.

In the above program, it is assumed that the address FFFF8004 specifying the MON_PARAM register is preset to the register 0 and the starting address of the download destination is preset to the register 1.

Next, processes associated with the MON_PARAM register will be described in detail.

A. Transfer of data from the debugging tool to the CPU using the MON_PARAM register;

① Writing of data into the MON_PARAM register by the debugging tool;

The debugging tool 52 serially writes data into the MON_PARAM register 84 by way of the JTAG interface 61.

The MON_PARAM output A signal furnished by the MON_PARAM register 84 is delivered, by way of the flip-flops 100g and 101g, to the monitor code supplying function 66, and then becomes the MON_PARAM output B signal synchronized with the CLK clock.

② Detection of an access to the MON_PARAM register;

The MON_PARAM access detecting unit 94 detects an access to the MON_PARAM register 84 from the value of the instruction register 82 and the status of the TAP controller 81. The MON_PARAM access detecting unit 94 makes the MON_PARAM access A signal state "1".

③ Writing of the value of the MON_PARAM output B signal into the FrontMON_PARAM register;

The MON_PARAM access A signal is delivered, by way of the flip-flops 100h and 101h, to the monitor code supplying function 66, and is then converted into a signal synchronized with the CLK clock. When the MON_PARAM access A signal makes a "0" to "1" transition, the flip-flop 102h and the AND gate 103h generate the MON_PARAM access B signal at state "1" having a duration corresponding to one clock cycle.

④ Reading of the contents of the FrontMON_PARAM register by the CPU;

When the CPU 53 executes an instruction to read data at the address FFFF8404 in hex, it furnishes a read request to the bus control circuit 58.

When the bus control circuit 58 receives the read request from the CPU 53, the CPU 53 generates and furnishes the following value:
a. the value sent out on the address bus: FFFF9000 in hex.
The bus control circuit 58 generates and furnishes the following value.
a. the value of the access request signal: "1";
b. the value of the read/write signal: "1" (in this case, a reading process is selected).

The internal bus interface unit 116 of the monitor code supplying function 66 decodes the address on the address bus 59a and then determines that the address is associated with a read request for the FrontMON_PARAM register 88. As a result, the internal bus interface unit 116 makes the FrontMON_PARAM read request signal state "1". The internal bus interface unit 116 sends out the value of the FrontMON_PARAM register 88 onto the data bus 59b and then makes the access completion signal state "1".

When the access completion signal becomes state "1", the CPU 53 retrieves the value on the data bus 59b.

The debugging tool 52 can recognize that the contents of the FrontMON_PARAM register 88 have been read by the CPU 53 from the value of the MNPRMVLD bit of the MON_ACCESS register 86. The MNPRMVLD bit set to "1" indicates that the contents of the FrontMON_PARAM register 88 have already been read by the CPU 53. The control of the MNPRMVLD bit will be described below.

B. Control of handshaking when using the MON_PARAM register;

① Setting of the MNPRMVLD bit to "1" when the debugging tool sets data to the MON_PARAM register;

The MNPRMVLD bit control unit 95 sets the MNPRMVLD bit of the MON_ACCESS register 86 to "1" when the MON_PARAM access detection A signal becomes state "1".

The MNPRMVLD bit set to "1" indicates that data set to the MON_PARAM register 84 has not been read yet by the CPU 53.

After the debugging tool 52 has set data to the MON_PARAM register 84, it accesses the MON_ACCESS register 86 to check the value of the MNPRMVLD bit. While the MNPRMVLD bit is at state "1", the debugging tool 52 does not set next data to the MON_PARAM register 84.

② Clearing of the MNPRMVLD bit to "0" when the CPU reads the contents of the FrontMON_PARAM register;

The monitor code supplying function 66 furnishes the MON_PARAM access C signal indicating that the MON_PARAM access A signal has been delivered thereto to the JTAG control unit 65.

When the MON_PARAM access C signal becomes state "1", the MNPRMVLD bit control unit 95 controls the MON_ACCESS register 86 so that the MNPRMVLD bit of the MON_ACCESS register 86 is set to the value of the FrontMON_PARAM valid signal.

The MON_PARAM valid control unit 114 generates the FrontMON_PARAM valid signal in the following manner.

a. When the debugging tool 52 accesses the MON_PARAM register 84, the above processes A-② and ③ are performed to make the MON_PARAM access B signal state "1". When the MON_PARAM access B signal becomes state "1", the FrontMON_PARAM valid signal is made state "1", indicating that valid data has already been set to the FrontMON_PARAM register 88.

b. After that, when the CPU 53 reads the data from the FrontMON_PARAM register 88, the process A-④ is performed to make the FrontMON_PARAM read request signal state "1". When the FrontMON_PARAM read request signal becomes state "1", the FrontMON_PARAM valid signal is cleared to "0", indicating that the contents of the FrontMON_PARAM register 88 have already been read by the CPU 53.

After the debugging tool 52 has set data to the MON_PARAM register 84, it accesses the MON_ACCESS register 86 to check the value of the MNPRMVLD bit. The debugging tool can thus recognize that when the MNPRMVLD bit becomes state "0", the value set to the MON_PARAM register 84 has already been read by the CPU 53.

The forcedly setting of the MNPRMVLD bit to "1" in the above B-① process and, after that, setting of the MNPRMVLD bit to the value of the FrontMON_PARAM valid signal in response to the FrontMON_PARAM access C signal are measures to make sure that after setting data to the MON_PARAM register 84, the setting of the FrontMON_PARAM valid signal to state "1" is done in time for checking the MNPRMVLD bit to set next data to the MON_PARAM register 84 even though the CLK clock speed is very low as compared with the TCK clock speed. In other words, when the CLK clock speed is very low as compared with the TCK clock speed, there is a possibility that after setting data to the MON_PARAM register 84, the setting of the FrontMON_PARAM valid signal to state "1" is delayed and hence is not in time for checking the MNCDBUSY bit to set next data to the MON_PARAM register 84. To avoid the problem, the setting of the MNPRMVLD bit to "1" is forcedly done at the same time that the setting of the MON_PARAM register 84 is done, and, after that, the MNPRMVLD bit control unit 95 controls the MNPRMVLD bit so that the MNPRMVLD bit reflects the value of the FrontMON_PARAM valid signal after it is determined that the FrontMON_PARAM valid signal precisely reflects whether the next value stored in the FrontMON_PARAM register 88 is valid or invalid.

Figure 10:
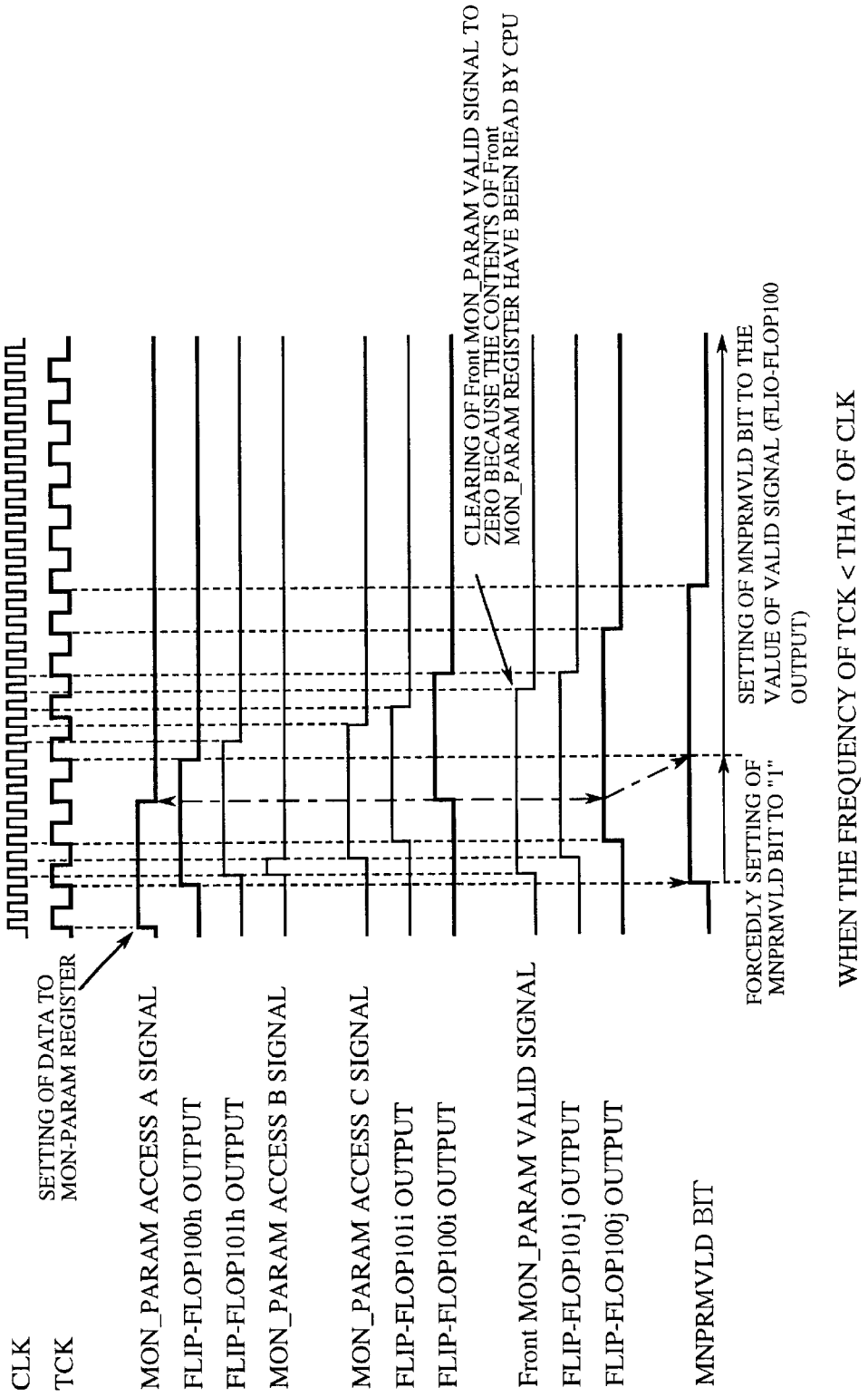
FIG. 10 is a timing chart showing various signals generated in a case where the frequency of the TCK clock<that of the CLK clock when processes associated with a MON_PARAM register of the JTAG control unit are performed.
Figure 11:
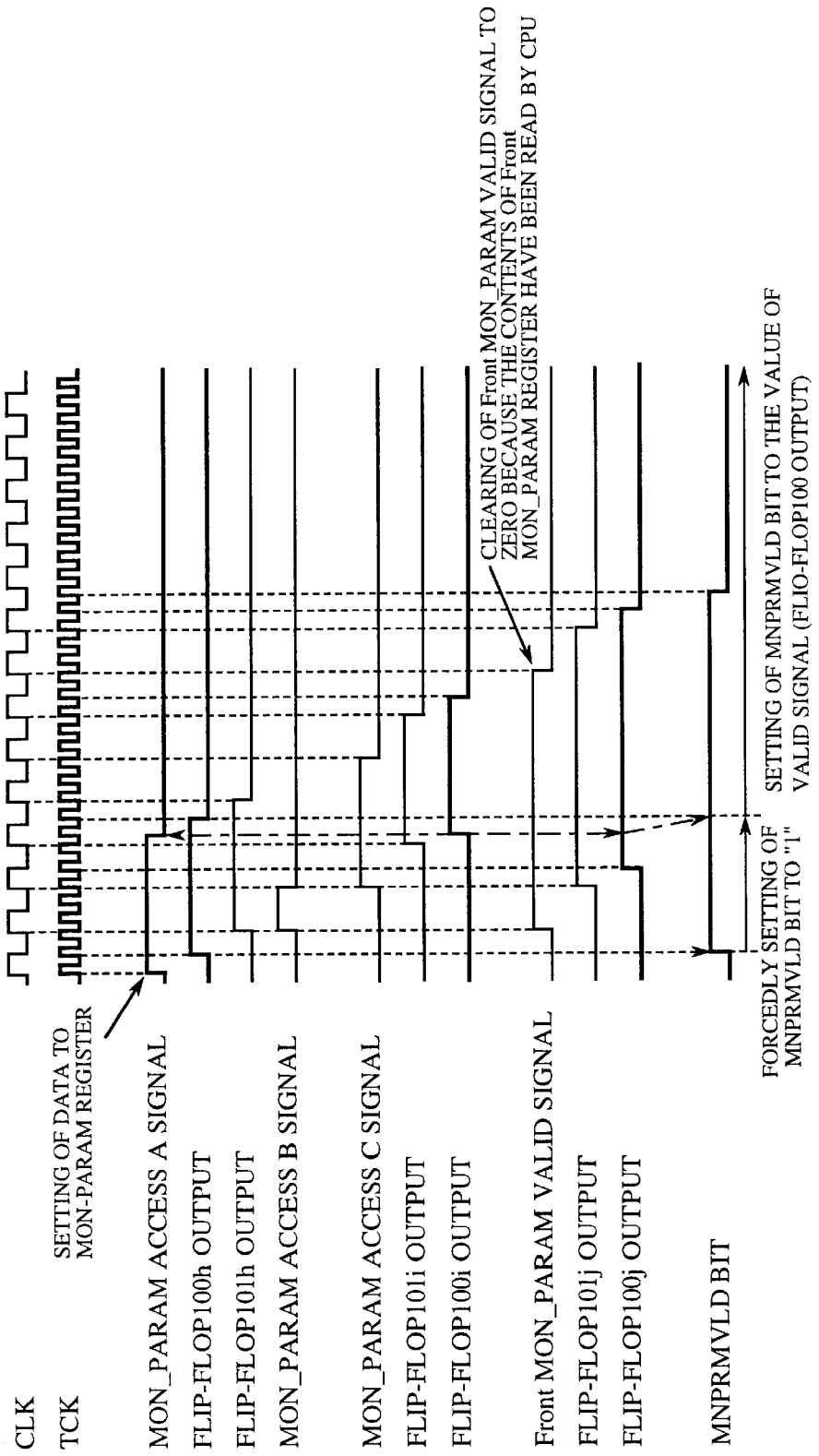
FIG. 11 is a timing chart showing various signals generated in a case where the frequency of the TCK clock>that of the CLK clock when the processes associated with the MON_PARAM register are performed.

FIG. 10 is a timing chart showing various signals generated in a case where the frequency of the TCK clock<that of the CLK clock when the processes associated with the MON_PARAM register are performed. FIG. 11 is a timing chart showing various signals generated in a case where the frequency of the TCK clock>that of the CLK clock when the processes associated with the MON_PARAM register are performed.

(4) Processes associated with the MON_DATA register;

The MON_DATA register 85 is a register that serves as an interface via which data obtained by the execution of the monitor program is furnished to the debugging tool 52 located outside the chip. In order to use the MON_DATA register 85, the monitor program including an instruction to write data into the FrontMON_DATA register 89 is executed via the MON_DATA register 85. For example, in order to read data stored in a memory location at the address 100, the CPU 53 is caused to execute the following program according to the above-mentioned processes (1) and (2), so that the debugging tool can then read the contents of the MON_DATA register 85.

a. LDI R0, #100: write "100" into the register 0;
b. LD R2, @R0: read data at the address (i.e., 100 in decimal) specified by the register 0, and write the data into the register 2;
c. LDI R1, #FFFF8000: write "FFFF8000 in hex" (i.e., the address of the FrontMON_DATA register) into the register 1;
d. ST R2,@R1: write the contents of the register 2 into the address (i.e., FFFF8000 in hex) specified by the register 1;

Next, the processes associated with the MON_DATA register will be described in detail.

A. Transfer of data from the CPU to the debugging tool using the MON_DATA register;
① Making a write request by the CPU;
When the CPU 53 executes an instruction to write data into a memory location at the address FFFF8400 in hex, it furnishes a write request to the bus control circuit 58.
When the bus control circuit 58 receives the write request from the CPU 53, the CPU 53 generates and furnishes the following values:
a. the value sent out on the address bus: FFFF8400 in hex;
b. the value sent out on the data bus: data to be written into the memory location.
The bus control circuit 58 generates and furnishes the following values:
a. the value of the access request signal: "1";
b. the value of the read/write signal: "0" (in this case, writing).
② Writing of the data into the FrontMON_DATA register;
The internal bus interface unit 116 of the monitor code supplying function 66 decodes the address on the address bus 59*a* and then determines that the address is associated with a write request for the FrontMON_DATA register 89. As a result, the internal bus interface unit 116 makes the FrontMON_DATA write request signal state "1". The data bus 59*b* is connected to the FrontMON_DATA register 89. While the FrontMON_DATA write request signal is at state "1", the data to be written on the data bus 59*b* is written into the FrontMON_DATA register 89.
③ Transfer of the data to the MON_DATA register;
The value of the FrontMON_DATA register 89 is transferred, by way of the flip-flops 101*k* and 100*k*, to the MON_DATA register 85.
④ Reading of the value of the MON_DATA register by the debugging tool;
The debugging tool 52 serially reads the contents of the MON_DATA register 85 by way of the JTAG interface 61.

The debugging tool 52 can recognize that the data from the CPU 53 has been written into the MON_DATA register 85 from the value of the MNDTVLD bit of the MON_ACCESS register 86. The MNDTVLD bit set to "1" indicates that the data from the CPU 53 has been set to the MON_DATA register 85. The control of the MNDTVLD bit will be described below.

B. Control of handshaking when using the MON_DATA register;
① Initialization of the MNDTVLD bit;
The MNDTVLD bit is initialized to state "0" when the debugging module 54 is reset.
② Setting of the MNDTVLD bit to "1" when the CPU writes data into to the FrontMON_DATA register;
When the CPU 53 writes data into the FrontMON_DATA register 89, the internal bus interface unit 116 makes the FrontMON_DATA write request signal state "1" according to the process A-②. In response to the FrontMON_DATA write request signal, the MON_DATA valid control unit 115 makes the FrontMON_DATA valid signal state "1". The FrontMON_DATA valid signal at state "1" is then delivered, by way of the flip-flops 101*n* and 100*n*, to the MNDTVLD control unit 97. The MNDTVLD control unit 97 then sets the MNDTVLD bit of the MON_ACCESS register 86 to the value of the FrontMON_DATA valid signal. In other words, the MNDTVLD bit is set to "1".

The debugging tool 52 recognizes that the data from the CPU 53 has been set into the MON_DATA register 85 because the MNDTVLD bit of the MON_ACCESS register 86 is set to "1". After that, the debugging tool 52 serially reads the contents of the MON_DATA register 85.

③ Clearing of the MNDTVLD bit to "0" after the debugging tool has read the contents of the MON_DATA register;

When the debugging tool 52 reads the contents of the MON_DATA register in performing the B-② process, the MON_DATA access detecting unit 96 detects the access to the MON_DATA register 85 from the value of the instruction register 82 and the status of the TAP controller 81, and then makes the MON_DATA access A signal state "1". When the MON_DATA access A signal becomes state "1", the MNDTVLD bit control unit 97 clears the value of the MNDTVLD bit to "0".

④ clearing of the MON_DATA valid signal to "0";

The MON_DATA access A signal is delivered, by way of the flip-flops 100*l* and 101*l*, to the monitor code supplying function 66. When the MON_DATA access A signal makes a "0" to "1" transition, the flip-flop 102*l* and the AND gate 103*l* generate a MON_DATA access B signal at state "1" having a duration corresponding to one clock cycle. When the MON_DATA access B signal becomes state "1", the MON_DATA valid control unit 115 makes the FrontMON_DATA valid signal state "0".

The MON_DATA access A signal, which has been delivered to the monitor code supplying function 66, is fed, as the MON_DATA access C signal, to the JTAG control unit 65 by way of the flip-flop 102*l*. The MON_DATA access C signal indicates that the MON_DATA access A signal has been delivered to the monitor code supplying function 66. When the MON_DATA access C signal becomes state "1", the MNDTVLD bit control unit 97 controls the MON_ACCESS register so that the MNDTVLD bit, which has been cleared to "0" in performing the process B-③, is set to the value of the FrontMON_DATA valid signal. After that, when the CPU 53 writes data into the FrontMON_DATA register 89, the debugging module advances to the process B-② wherein the MNDLVLD bit control unit 97 sets the MNDTVLD bit to "1".

The forcedly setting of the MNDTVLD bit to "1" in the above B-③ process and, after that, setting of the MNDTVLD bit to the value of the FrontMON_DATA valid signal in response to the MON_DATA access C signal are measures to make sure that after reading data from the MON_DATA register 85, the clearing of the FrontMON_DATA valid signal to "0" is done in time for checking the MNDTVLD bit to read next data from the MON_DATA register 85 even though the CLK clock speed is very low as compared with the TCK clock speed. In other words, when the CLK clock speed is very low as compared with the TCK clock speed, there is a possibility that after reading data from the MON_DATA register 85, the clearing of the FrontMON_DATA valid signal to "0" is delayed and hence is not in time for checking the MNDTVLD bit to read next data from the MON_DATA register 85. To avoid the problem, the clearing of the MNDTVLD bit to "0" is forcedly done at the same time that the reading of the MON_DATA register 85 is done, and, after that, the MNDTVLD bit control unit 97 controls the MNDTVLD bit so that the MNDTVLD bit reflects the value of the FrontMON_DATA valid signal after it is determined that the FrontMON_DATA valid signal precisely reflects whether the next value stored in FrontMON_DATA register 89 is valid or invalid.

Figure 12:
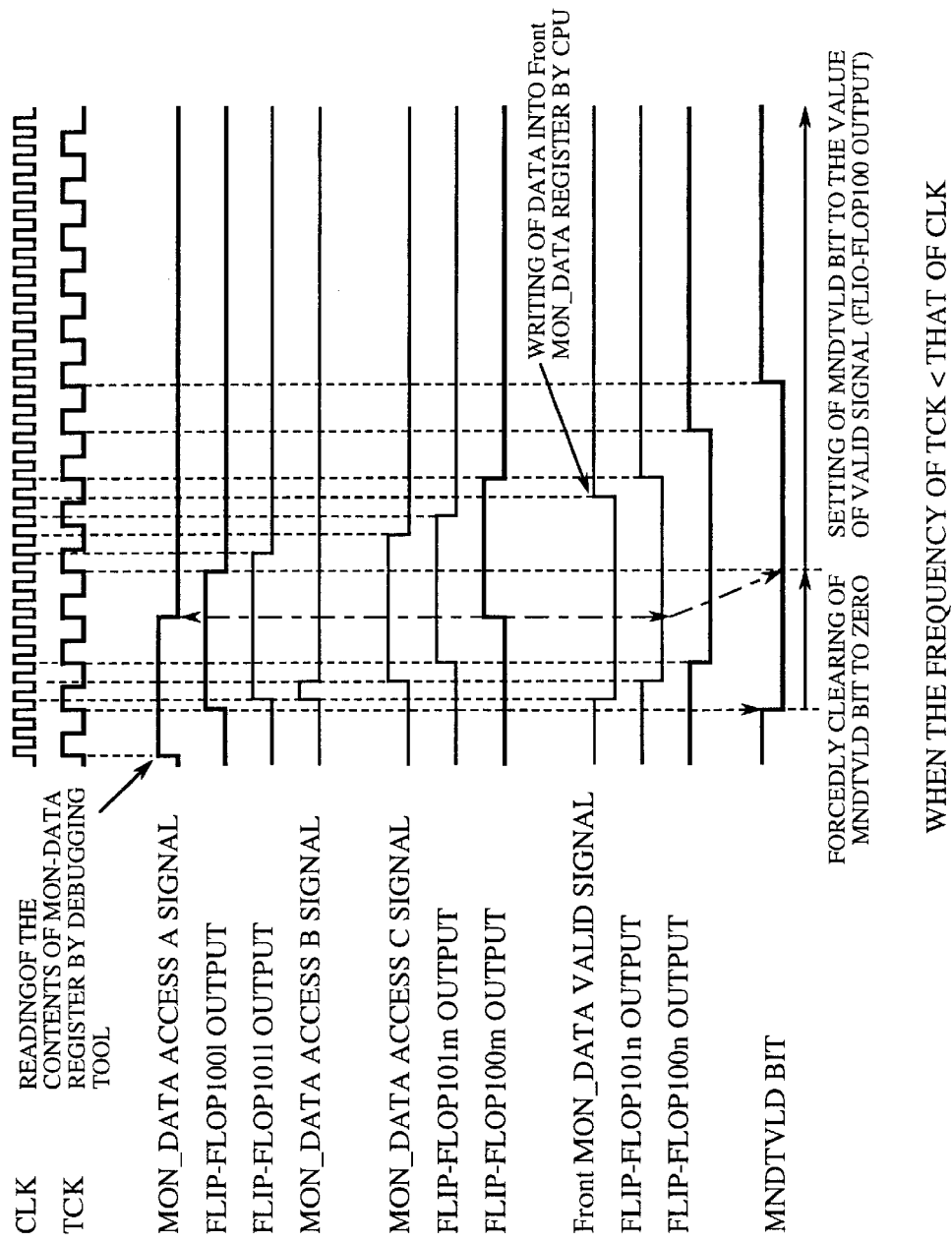
FIG. 12 is a timing chart showing various signals generated in a case where the frequency of the TCK clock<that of the CLK clock when processes associated with a MON_DATA register of the JTAG control unit are performed.
Figure 13:
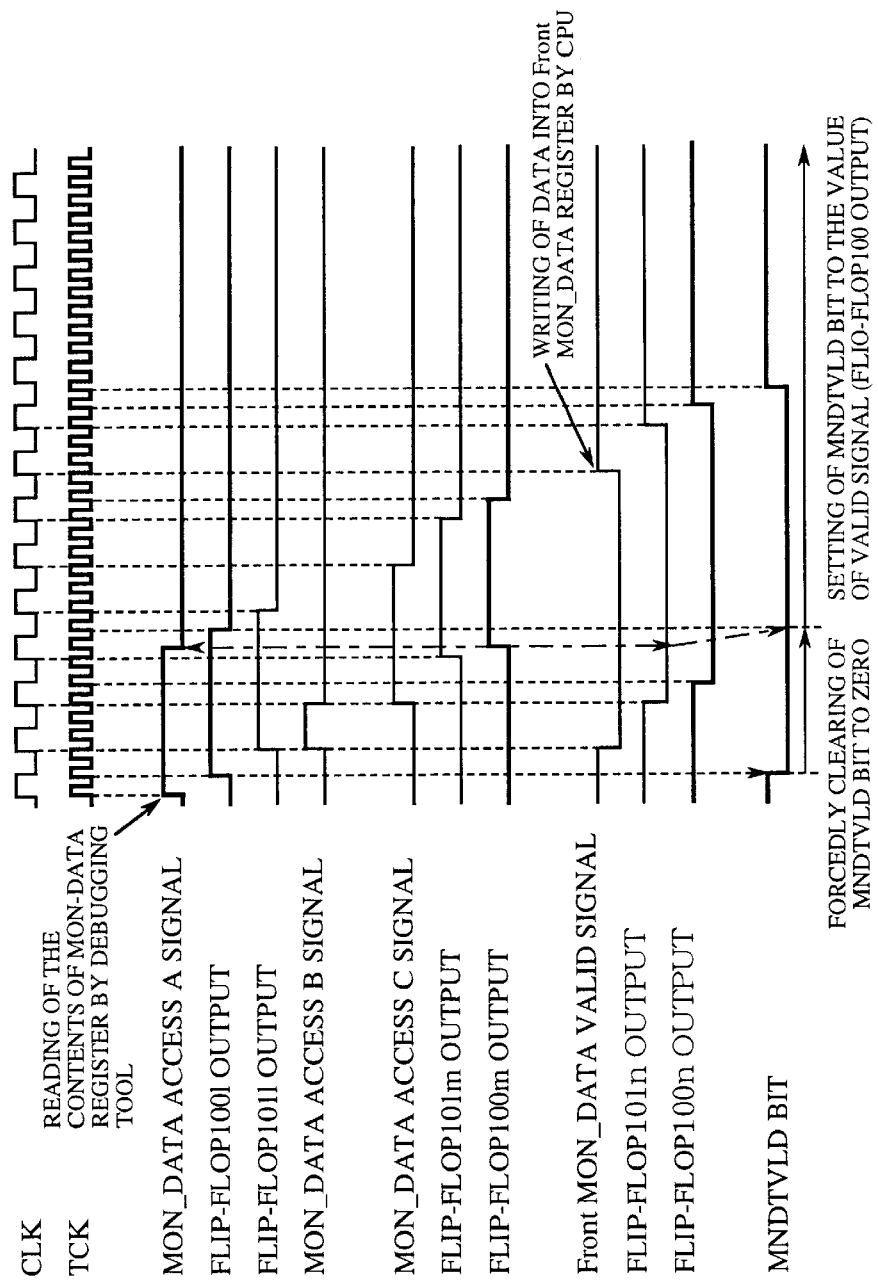
FIG. 13 is a timing chart showing various signals generated in a case where the frequency of the TCK clock>that of the CLK clock when the processes associated with the MON_DATA register are performed.
Figure 14:
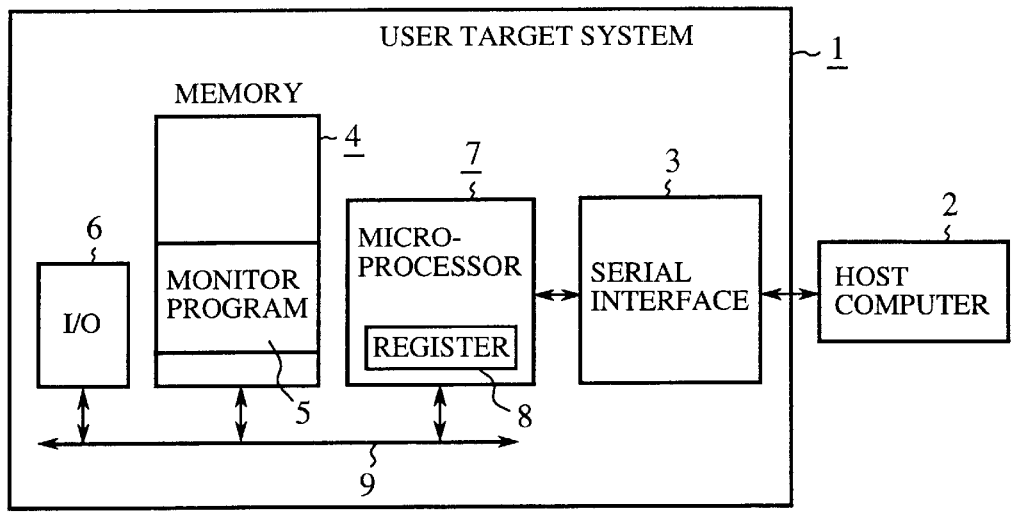
FIG. 14 is a block diagram showing the structure of a prior art microcomputer.
Figure 17:
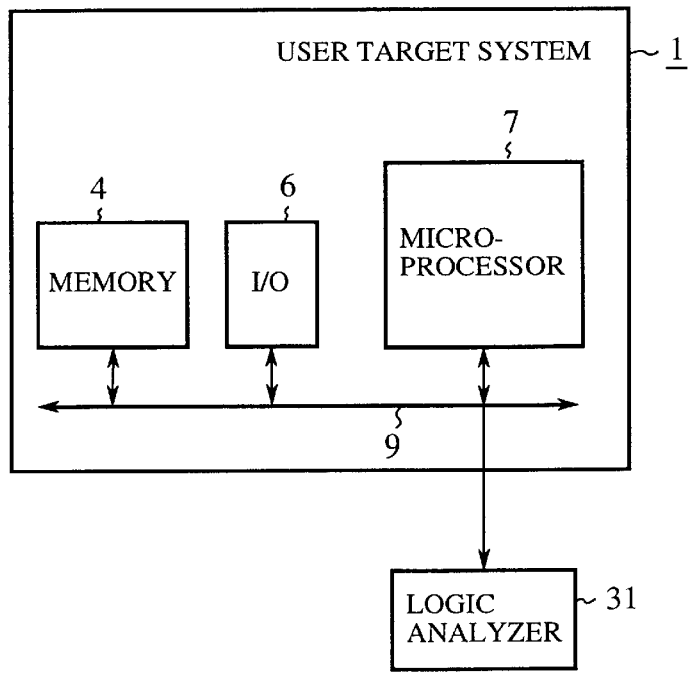
FIG. 17 is a block diagram showing the structure of another prior art microcomputer.
Figure 15:
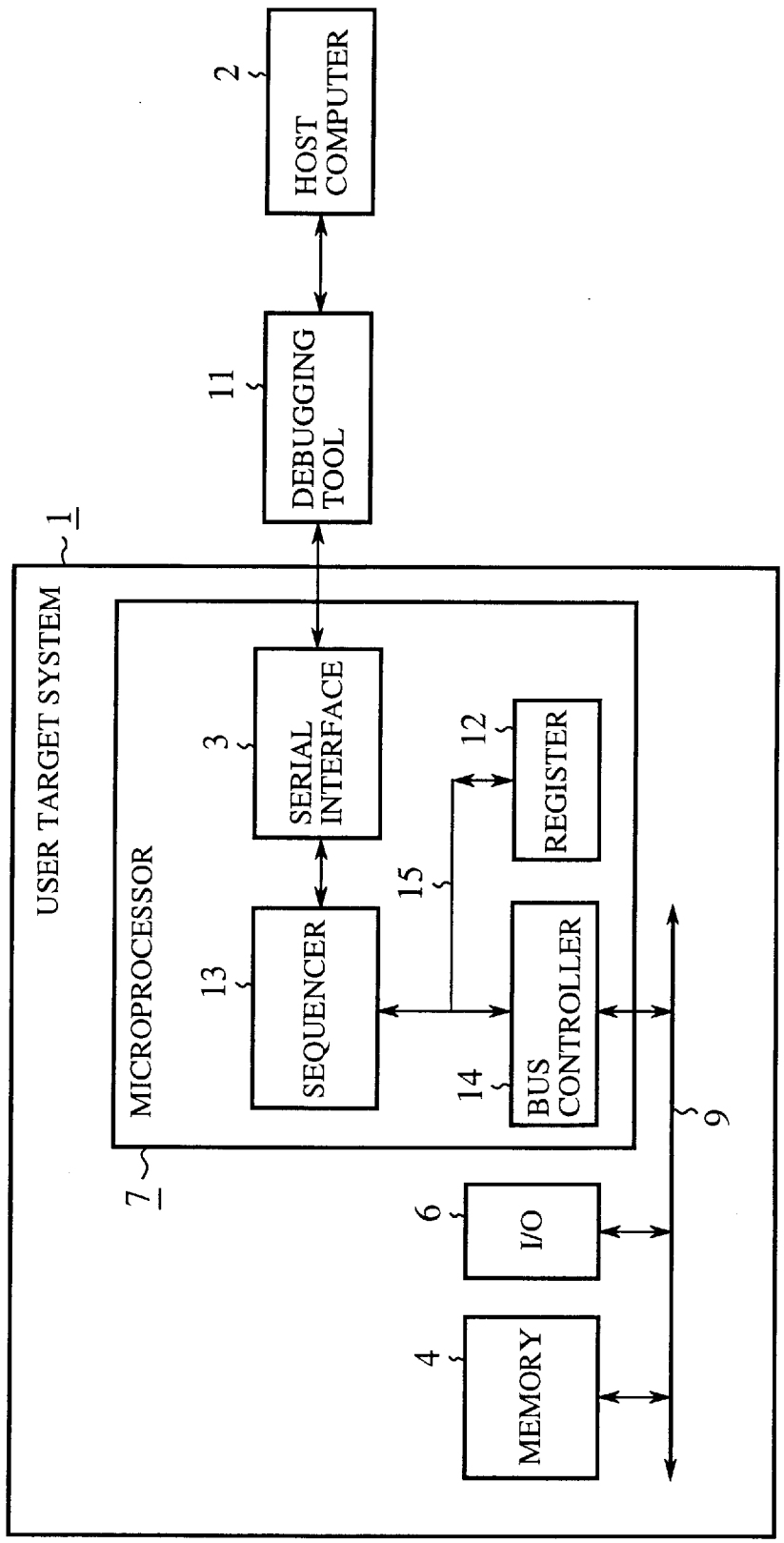
FIG. 15 is a block diagram showing the structure of another prior art microcomputer.
Figure 16:
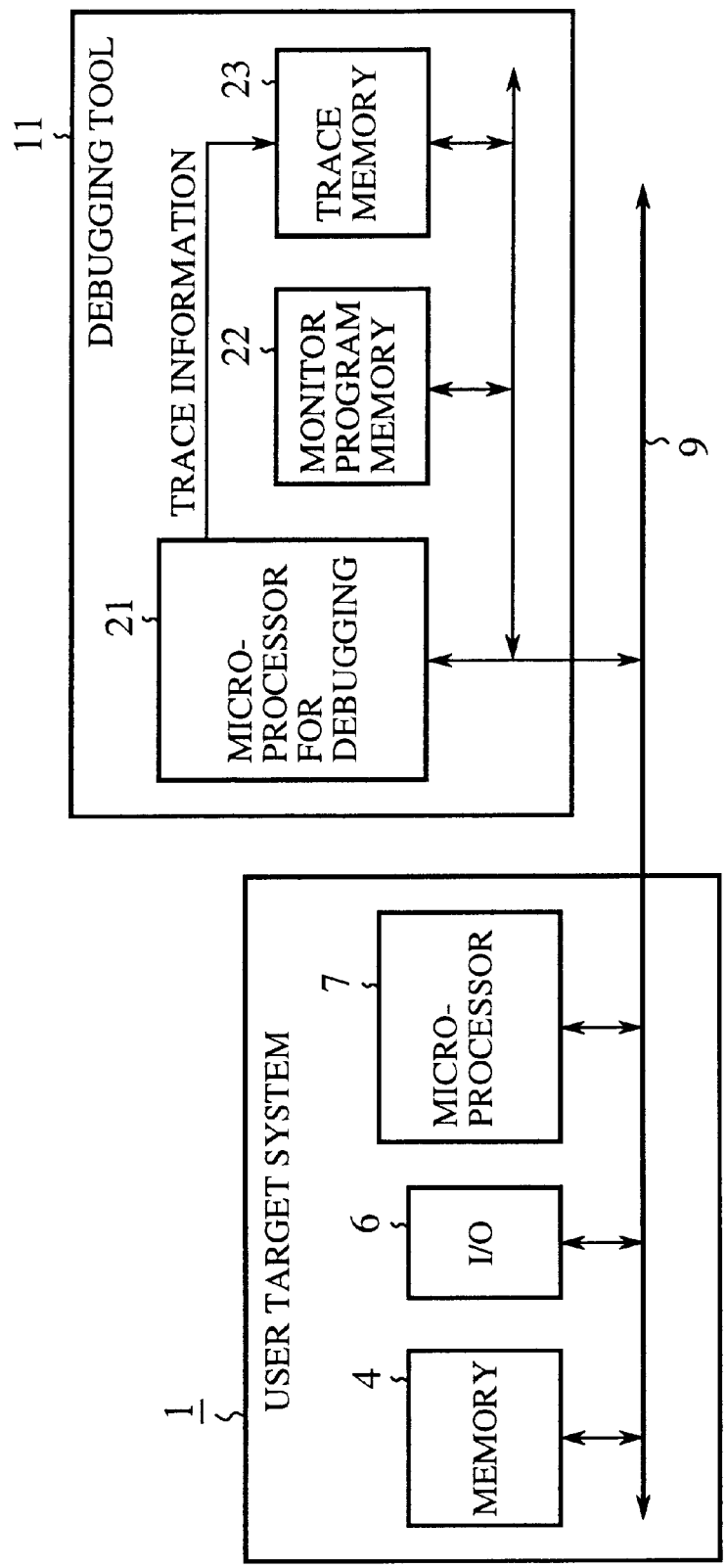
FIG. 16 is a block diagram showing the structure of another prior art microcomputer.
Figure 18:
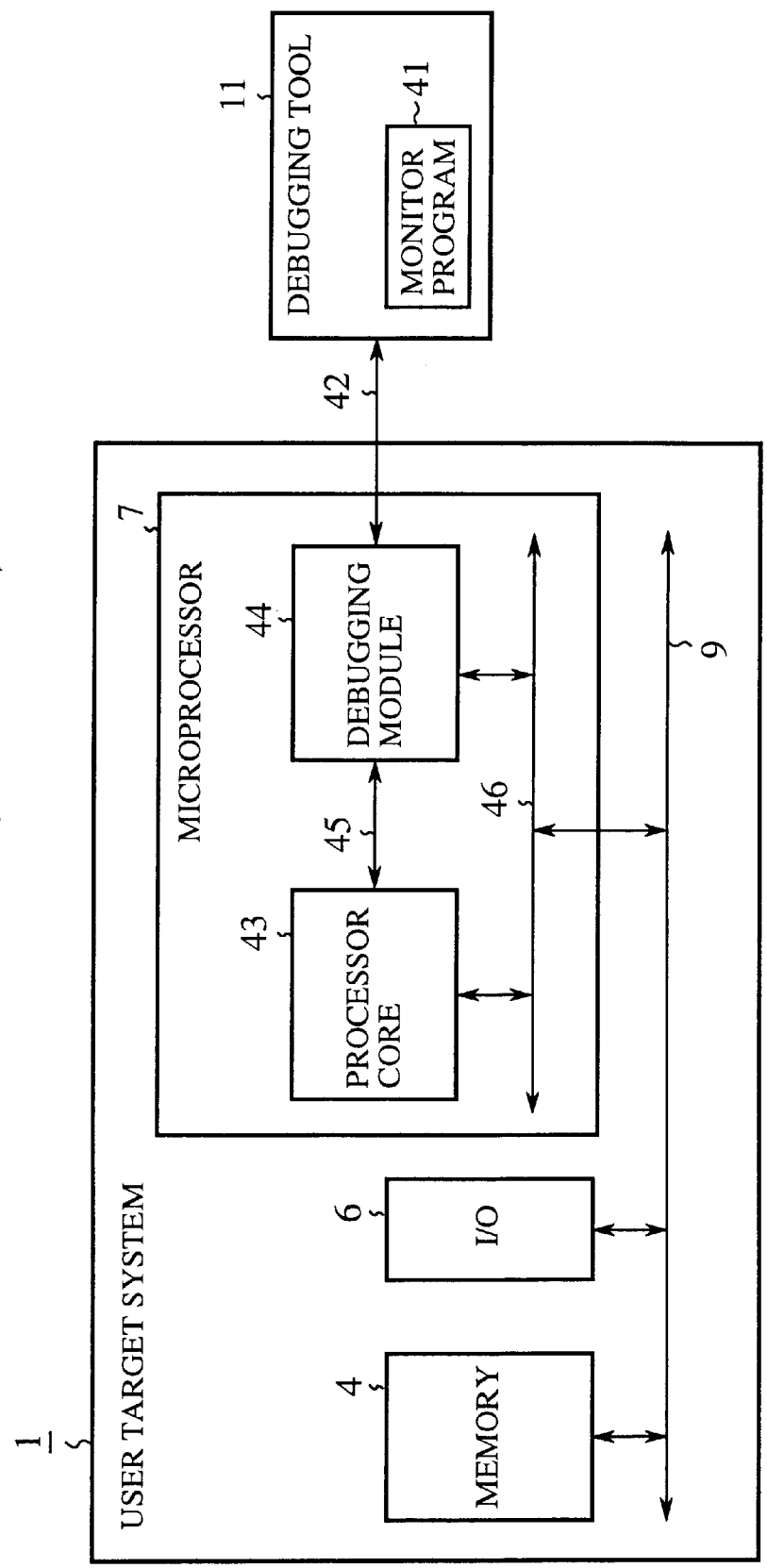
FIG. 18 is a block diagram showing the structure of another prior art microcomputer.

FIG. 12 is a timing chart showing various signals generated in a case where the frequency of the TCK clock<that of the CLK clock when the processes associated with the MON_DATA register are performed. FIG. 13 is a timing chart showing various signals generated in a case where the frequency of the TCK clock>that of the CLK clock when the processes associated with the MON_DATA register are performed.

In accordance with the embodiment shown, there is provided the buffer input control unit 111 for automatically incrementing the input pointer specifying the next storage location or next entry of the instruction code buffer every time a transfer of an instruction code is done. As an alternative, a 2-bit area can be added to the MON_CODE register 83, for storing a specific code ("00" corresponding to the first entry #0, "01" corresponding to the second entry #1, "10" corresponding to the third entry #2, and "11" corresponding to the fourth entry #3) for specifying in which entry (#0, . . . , or #3) within the instruction code buffer 87 an instruction code transferred thereto from the debugging tool 52 is stored. The debugging tool 52 furnishes the specific code to the MON_CODE register 83 as well as the instruction code. In this case, the buffer input control unit 111 can specify the input pointer specifying the next storage location of the instruction code buffer 87 according to the specific code associated with the transferred instruction code. The transferred instruction code can thus be set to an arbitrary entry within the instruction code buffer 87.

In accordance with the embodiment shown, there is provided the buffer output control unit 112 for controlling the CPU 52 to make it furnish a branch instruction to prevent the value of the program counter from incrementing, in case that any instruction code is not set to the instruction code buffer 87 when the CPU 53 fetches an instruction. As an alternative, the internal bus interface unit 116 can generate and furnish an access completion signal asserted at state "0" to the CPU 53 when the buffer valid control unit 113 generates the buffer valid signal at state "0", that is, when any instruction code is set to the instruction code buffer 87, and generate and furnish the access end signal negated at state "1" to the CPU 53 when the buffer valid control unit 113 generates the buffer valid signal at state "1", that is, when one or more instruction codes are already set to the instruction code buffer 87. In this case, it is possible to prevent the CPU 53 from performing needless execution of instructions until one or more instruction codes are set to the instruction code buffer 87.

In accordance with the embodiment shown, there is provided the instruction code buffer 87 in order to increase the efficiency of instruction code transfer. However, the instruction code buffer 87 is not an indispensable component. As an alternative, the CPU 53 can read an instruction code directly from the MON_CODE register 83 by way of the internal bus interface unit 116. In this case, the buffer input control unit 111, buffer output control unit 112, and buffer valid control unit 113 are provided as devices intended for the MON_CODE register 83.

In addition, in accordance with the embodiment shown, there is provided the FrontMON_PARAM register 88 and the FrontMON_DATA register 89. However, these registers 88 and 89 are not indispensable components. As an alternative, the CPU 53 can read parameters directly from the MON_PARAM register 84, and write data directly into the MON_DATA register 85, by way of the internal bus interface unit 116. In this case, the MON_PARAM valid control unit 114 and MON_DATA valid control unit 115 are provided as devices intended for the MON_PARAM register 83 and MON_DATA register 85.

Thus, the present embodiment offers the advantage of being able to make the CPU execute the monitor program supplied thereto from the debugging tool by only providing the various types of registers connected to the JTAG interface and the instruction code buffer, thus being able to debug the microcomputer itself with reliability and with efficiency without having to upsize the debugging system.

Further, since the microcomputer further comprises the instruction code buffer 87 for holding one or more instruction codes supplied thereto from the MON_CODE register 85, the debugging tool 53 can set the next instruction code to the MON_CODE register 85 while CPU 53 reads an instruction code set to the instruction code buffer, thus improving the efficiency of transfer of instruction codes and hence the debugging processing efficiency.

In addition, the instruction code buffer 87 can include a plurality of storage areas, i.e., entries, for storing a plurality of instruction codes sequentially furnished thereto from the MON_CODE register 85, and the MON_CODE register 85 can hold an entry specifying code specifying in which area of the instruction code buffer the next instruction code from the MON_CODE register 85, which is included with the debugging program and is applied to the microcomputer via the serial interface, is to be stored, as well as the instruction code. Further, the microcomputer further comprises the buffer input control unit 111 for furnishing the instruction code held by the MON_CODE register 85 to a storage area of the instruction code buffer 87 specified by the entry specifying code to allow the storage area to hold the instruction code. Accordingly, the efficiency of transfer of instruction codes is improved and the debugging processing efficiency is therefore improved. Further, the debugging tool 52 can furnish an instruction code to an arbitrary storage area of the instruction code buffer 87 to allow the entry to hold the instruction code.

As an alternative, the instruction code buffer 87 includes a plurality of storage areas for storing a plurality of instruction codes sequentially furnished thereto from the MON_CODE register 85, and the microcomputer further comprises the buffer input control unit 111 for, when the microcomputer sequentially receives a plurality of instruction codes from the debugging tool 52, sequentially furnishing the plurality of instruction codes sequentially held by the MON_CODE register 85 to the respective storage areas of the instruction code buffer 87, to allow the plurality of storage areas to hold the plurality of instruction codes, respectively. Accordingly, the efficiency of transfer of instruction codes is improved and the debugging processing efficiency is therefore improved. Further, the debugging tool 52 can easily set an instruction code to an arbitrary storage area of the instruction code buffer 87 to allow the entry to hold the instruction code, without having to furnish an entry specifying code.

In addition, in accordance with the preferred embodiment shown, the microcomputer further comprises the buffer valid control unit 113 for generating a valid signal indicating whether the instruction code held by the MON_CODE register 85 is valid or invalid, and the MON_ACCESS register 86 for holding the value of the valid signal generated by the buffer valid control unit 113, for enabling the debugging tool 52 to read the value of the valid signal by way of the serial interface. Accordingly, the debugging tool 52 can determine the timing of transferring the next instruction code to the MON_CODE register 85 according to the value of the valid signal, thus being able to set an instruction code to the MON_CODE register 85 with efficiency.

In accordance with the exemplary embodiment shown, the microcomputer further comprises the internal bus interface unit 116 for furnishing a negated access completion signal to the CPU 53 when the valid signal generated by the buffer valid control unit 113 indicates that the instruction code held by the MON_CODE register 85 is invalid, and for furnishing an asserted access completion signal to the CPU 53 when the valid signal generated by the buffer valid control unit 113 indicates that the instruction code held by the MON_CODE register 85 is valid. The provision of the internal bus interface unit 116 makes it possible to prevent the CPU 53 from performing needless execution of instruction codes until an instruction code is set to the MON_CODE register 85.

In addition, in accordance with the preferred embodiment mentioned above, the microcomputer further comprises the buffer output control unit 112, responsive to an instruction-fetching request from the CPU 53, for furnishing a branch instruction to prevent the program counter's current value from incrementing to the CPU 53 when the valid signal generated by the buffer valid control unit 113 indicates that the instruction code held by the MON_CODE register 85 is invalid. The provision of the buffer output control unit 112 makes it possible to make the buses, which can be accessed by the CPU 53, available to anyone until an instruction code is set to the MON_CODE register 85.

Further, the buffer output control unit 112 can furnish the branch instruction to prevent the program counter's current value from incrementing to the CPU 53 when the instruction-fetching request is an instruction-prefetching request or when the valid signal generated by the buffer valid control unit 113 indicates that the instruction code held by the MON_CODE register 85 is invalid. This results in preventing malfunctions from occurring when an instruction-prefetching request is made.

In accordance with the exemplary embodiment shown, the microcomputer further comprises the MON_ACCESS register 86 for holding the value of an instruction code setting completion signal applied thereto by way of the serial interface, indicating that one or more instruction codes have already been set to the instruction code buffer 87; the MNSTART bit setting detecting unit 92 for detecting whether or not the MON_ACCESS register 86 is holding the value of the instruction code setting completion signal; and the buffer valid control unit 113 for generating a valid signal indicating that one or more instruction codes held by the instruction code buffer are valid when the MNSTART bit setting detecting unit detects the holding of the value of the instruction code setting completion signal. Applying the instruction code setting completion signal to the MON_ACCESS register enables the buffer valid control unit 113 to generate the valid signal indicating that the instruction codes stored in the instruction code buffer are valid, so that the CPU can read the same set of instruction codes held by the buffer a number of times without having to repeatedly transferring the set of instruction codes, by way of the serial interface, to the buffer, thus eliminating the need for repeatedly setting the same set of instruction codes.

In accordance with the preferred embodiment, the microcomputer further comprises the MON_DATA register 85 into which the CPU 53 can write data, for enabling the debugging tool to read the data by way of the serial interface. Accordingly, the debugging tool can read data from the CPU 53, and therefore the workability of the debugging system is improved.

The microcomputer further comprise the MON_DATA valid control unit 115 for generating a valid signal indicating whether data held by the MON_DATA register 85 is valid or invalid, and the MON_ACCESS register 86 for holding the value of the valid signal generated by the MON_DATA valid control unit 115 and for enabling the debugging tool to read the value of the valid signal by way of the serial interface. Accordingly, the debugging tool can determine the timing of reading data next according to the value of the valid signal, therefore being able to read the data with efficiency.

In accordance with the preferred embodiment mentioned above, the microcomputer further comprises the MON_PARAM register 84 for holding data applied thereto by way of the serial interface. Further, the CPU can read the data held by the MON_PARAM register 84. Accordingly, the debugging tool can transfer data to the CPU 53, and therefore the workability of the debugging system is improved.

The microcomputer further comprises the MON_PARAM valid control unit 114 for generating a valid signal indicating whether data held by the MON_PARAM register 84 is valid or invalid, and the MON_ACCESS register 86 for holding the value of the valid signal generated by the MON_PARAM valid control unit 114 and for enabling the debugging tool to read the value of the valid signal by way of the serial interface. Accordingly, the debugging tool can determine the timing of transferring data next according to the value of the valid signal, therefore being able to set the data to the microcomputer with efficiency.

Preferably, the serial interface is a JTAG interface. Accordingly, the serial interface can also serve as an interface for boundary scan test. In other words, there is no need to provide a serial interface intended for debugging, thus simplifying the structure of the microcomputer.

In addition, in accordance with the preferred embodiment, the serial interface and the MON_DATA register 83 operate on the TCK clock, and the instruction code buffer and the CPU operate on the CLK clock independent of the TCK clock. This makes it possible to freely set the operating frequency of the CPU while keeping the rate of transferring data or the like between the microcomputer and the debugging tool constant using the TCK clock.

In accordance with the referred embodiment shown, the microcomputer further comprises the MON_ACCESS register 86 that operates on the TCK clock, for holding the value of a signal indicating whether an instruction code can be set to the MON_CODE register 83 and for enabling the debugging tool to read the value of the signal by way of the serial interface; the MON_CODE access detecting unit 91 that operates on the TCK clock, for generating an access detection signal when detecting an access from the debugging tool to the MON_CODE register 83; the access detection signal transmitting unit that operates on the CLK clock, for generating an access detection recognition signal in response to the access detection signal from the MON_CODE access detecting unit 91; the buffer valid control unit 113 that operates on the CLK clock, for generating a valid signal indicating that one or more instruction codes held by the buffer are valid or invalid; and the MNCDBUSY bit control unit 93 that operates on the TCK clock, for causing the MON_ACCESS register 86 to hold a value indicating that any instruction code cannot be set to the MON_CODE register 83 in response to the access detection signal from the MON_CODE access detecting unit, and for causing the MON_ACCESS register 86 to hold the value of the valid signal generated by the buffer valid control unit 113 in response to the access detection recognition signal from the flip-flop 102b. Accordingly, even when the CLK clock speed is very low as compared with the TCK clock or even when the CLK clock speed is very high as compared with the TCK clock, the handshaking function of preventing malfunctions from occurring when setting instruction codes to the buffer can be implemented.

In accordance with the exemplary embodiment shown, the microcomputer further comprises: the MON_ACCESS register 86 that operates on the TCK clock, for holding the value of a signal indicating whether one or more instruction codes have already been set to the buffer; the MNSTART bit setting detecting unit 92 that operates on the TCK clock, for generating an instruction code setting completion signal when determining that the MON_ACCESS register 86 is holding the value of the signal; the instruction code setting completion signal transmitting unit that operates on the CLK clock, for generating an instruction code setting completion recognition signal in response to the instruction code setting completion signal from the MNSTART bit setting detecting unit 92; the buffer valid control unit 113 that operates on the CLK clock, for generating a valid signal indicating that the one or more instruction codes held by the buffer are valid or invalid; and the MNCDBUSY bit control unit 93 that operates on the TCK clock, for causing the MON_ACCESS register 86 to hold a value indicating that one or more instruction codes have already been set to the buffer in response to the instruction code setting completion signal from the MNSTART bit setting detecting unit, and for causing the MON_ACCESS register 86 to hold the value of the valid signal generated by the buffer valid control unit in response to the instruction code setting completion recognition signal from the instruction code setting completion signal transmitting unit. Accordingly, even when the CLK clock speed is very low as compared with the TCK clock or even when the CLK clock speed is very high as compared with the TCK clock, the handshaking function of preventing malfunctions from occurring when the CPU executes each of instruction codes set to the buffer can be implemented.

In accordance with the preferred embodiment mentioned above, the microcomputer further comprises: the MON_ACCESS register 86 that operates on the TCK clock, for holding the value of a signal indicating whether data held by the MON_DATA register 85 is valid or invalid, and for enabling the debugging tool to read the value of the signal by way of the serial interface; the MON_DATA access detecting unit 96 that operates on the TCK clock, for generating an access detection signal when detecting an access from the debugging tool to the MON_DATA register 85; the access detection signal transmitting unit that operates on the CLK clock, for generating an access detection recognition signal in response to the access detection signal from the access detecting unit; the MON_DATA valid control unit 115 that operates on the CLK clock, for generating a valid signal indicating that data held by the FrontMON_DATA register 89 is valid or invalid; and the MNDTVLD bit control unit 97 that operates on the TCK clock, for causing the MON_ACCESS register 86 to hold a value indicating that the data held by the MON_DATA register 85 is invalid in response to the access detection signal from the MON_DATA access detecting unit, and for causing the MON_ACCESS register 86 to hold the value of the valid signal generated by the MON_DATA valid control unit in response to the access detection recognition signal from the access detection signal transmitting unit. Accordingly, even when the CLK clock speed is very low as compared with the TCK clock or even when the CLK clock speed is very high as compared with the TCK clock, the handshaking function of preventing malfunctions from occurring when the CPU sets data into the MON_DATA register can be implemented.

In accordance with the exemplary embodiment shown, the microcomputer further comprises: the MON_ACCESS register 86 that operates on the TCK clock, for holding the value of a signal indicating whether data held by the MON_PARAM register 84 has already been read by the CPU, and for enabling the debugging tool to read the value of the signal by way of the serial interface; the MON_PARAM access detecting unit 94 that operates on the TCK clock, for generating an access detection signal when detecting an access from the debugging tool to the MON_PARAM register 84; the access detection signal transmitting unit that operates on the CLK clock, for generating an access detection recognition signal in response to the access detection signal from the access detecting unit; the MON_PARAM valid control unit 114 that operates on the CLK clock, for generating a valid signal indicating whether data that has been transferred from the MON_PARAM register and is held by the FrontMON_PARAM register 88 is valid or invalid; and the MNPRMVLD bit control unit 95 that operates on the TCK clock, for causing the MON_ACCESS register 86 to hold a value indicating that the data held by the MON_PARAM register 84 has not been read yet by the CPU in response to the access detection signal from the MON_PARAM access detecting unit, and for causing the MON_ACCESS register 86 to hold the value of the valid signal generated by the MON_PARAM valid control unit 114 in response to the access detection recognition signal from the access detection signal transmitting unit. Accordingly, even when the CLK clock speed is very low as compared with the TCK clock or even when the CLK clock speed is very high as compared with the TCK clock, the handshaking function of preventing malfunctions from occurring when the debugging tool sets data into the MON_PARAM register can be implemented.

Many widely different embodiments of the present invention may be constructed without departing from the spirit and scope of the present invention. It should be understood that the present invention is not limited to the specific embodiments described in the specification, except as defined in the appended claims.

What is claimed is:

1. A microcomputer comprising:
   a serial interface for receiving a debugging program applied thereto from a debugging tool;
   a first register for holding an instruction code included with the debugging program, which is applied to said microcomputer via said serial interface;
   a central processing unit or CPU for executing the instruction code held by said first register; and
   a buffer for holding one or more instruction codes supplied thereto from said first register, wherein said CPU executes the instruction code held by said buffer.

2. The microcomputer according to claim 1, wherein said buffer includes a plurality of storage areas for storing a plurality of instruction codes sequentially furnished thereto from said first register, and said first register holds an entry specifying code specifying in which area of said buffer a next instruction code from said first register, which is included with the debugging program and is applied to said microcomputer via said serial interface, is to be stored, as well as the instruction code, and wherein said microcomputer further comprises input control means for furnishing the instruction code held by said first register to a storage area of said buffer specified by the entry specifying code to allow the storage area to hold the instruction code.

3. The microcomputer according to claim 1, wherein said buffer includes a plurality of storage areas for storing a plurality of instruction codes sequentially furnished thereto from said first register, and wherein said microcomputer further comprises input control means for, when said microcomputer sequentially receives a plurality of instruction codes from said debugging tool, sequentially furnishing the plurality of instruction codes sequentially held by said first register to the respective storage areas of said buffer, to allow the plurality of storage areas to hold the plurality of instruction codes, respectively.

4. The microcomputer according to claim 1, further comprising: a second register for holding the value of an instruction code setting completion signal applied thereto by way of said serial interface, indicating that one or more instruction codes have already been set to said buffer; instruction code setting completion detecting means for determining whether or not said second register is holding the value of the instruction code setting completion signal; and valid control means for generating a valid signal indicating that one or more instruction codes held by said buffer are valid when said instruction code setting completion detecting means detects the holding of the value of the instruction code setting completion signal.

5. The microcomputer according to claim 1, further comprising a second register into which said CPU can write data, for enabling said debugging tool to read the data by way of said serial interface.

6. The microcomputer according to claim 5, further comprising valid control means for generating a valid signal indicating whether data held by said second register is valid or invalid, and a third register for holding the value of the valid signal generated by said valid control means and for enabling said debugging tool to read the value of the valid signal by way of said serial interface.

7. The microcomputer according to claim 1, wherein said serial interface is a JTAG (Joint Test Action Group) interface.

8. The microcomputer according to claim 1, wherein said serial interface and said first register operate on a first clock, and said buffer and said CPU operate on a second clock independent of the first clock.

9. The microcomputer according to claim 8, further comprising: a second register that operates on the first clock, for holding the value of a signal indicating whether an instruction code can be set to said first register and for enabling said debugging tool to read the value of the signal by way of said serial interface; access detecting means that operates on the first clock, for generating an access detection signal when detecting an access from said debugging tool to said first register; access detection signal transmitting means that operates on the second clock, for generating an access detection recognition signal in response to the access detection signal from said access detecting means; valid control means that operates on the second clock, for generating a valid signal indicating that one or more instruction codes held by said buffer are valid or invalid; and second-register control means that operates on the first clock, for causing said second register to hold a value indicating that any instruction code cannot be set to said first register in response to the access detection signal from said access detecting means, and for causing said second register to hold the value of the valid signal generated by said valid control means in response to the access detection recognition signal from said access detection signal transmitting means.

10. The microcomputer according to claim 8, further comprising: a second register that operates on the first clock, for holding the value of a signal indicating whether one or more instruction codes have already been set to said buffer; instruction code setting completion detecting means that operates on the first clock, for generating an instruction code setting completion signal when determining that said second register is holding the value of the signal; instruction code setting completion signal transmitting means that operates on the second clock, for generating an instruction code setting completion recognition signal in response to the instruction code setting completion signal from said instruction code setting completion signal generating means; valid control means that operates on the second clock, for generating a valid signal indicating that said one or more instruction codes held by said buffer are valid or invalid; and second-register control means that operates on the first clock, for causing said second register to hold a value indicating that one or more instruction codes have already been set to said buffer in response to the instruction code setting completion signal from said instruction code setting completion generating means, and for causing said second register to hold the value of the valid signal generated by said valid control means in response to the instruction code setting completion recognition signal from said instruction code setting completion signal transmitting means.

11. The microcomputer according to claim 8, further comprising: a second register that operates on the first clock, for holding the value of a signal indicating whether data held by a third register is valid or invalid, and for enabling said debugging tool to read the value of the signal by way of said serial interface; access detecting means that operates on the first clock, for generating an access detection signal when detecting an access from said debugging tool to said third register; access detection signal transmitting means that operates on the second clock, for generating an access detection recognition signal in response to the access detection signal from said access detecting means; valid control means that operates on the second clock, for generating a valid signal indicating that data held by a fifth register is valid or invalid; and second-register control means that operates on the first clock, for causing said second register to hold a value indicating that the data held by said third register is invalid in response to the access detection signal from said access detecting means, and for causing said second register to hold the value of the valid signal generated by said valid control means in response to the access detection recognition signal from said access detection signal transmitting means.

12. The microcomputer according to claim 8, further comprising: a second register that operates on the first clock, for holding the value of a signal indicating whether data held by a fourth register has already been read by said CPU, and for enabling said debugging tool to read the value of the signal by way of said serial interface; access detecting means that operates on the first clock, for generating an access detection signal when detecting an access from said debugging tool to said fourth register; access detection signal transmitting means that operates on the second clock, for generating an access detection recognition signal in response to the access detection signal from said access detecting means; valid control means that operates on the second clock, for generating a valid signal indicating whether data that has been transferred from said fourth register and is held by a sixth register is valid or invalid; and second-register control means that operates on the first clock, for causing said second register to hold a value indicating that the data held by said fourth register has not been read yet by the CPU in response to the access detection signal from said access detecting means, and for causing said second register to hold the value of the valid signal generated by said valid control means in response to the access detection recognition signal from said access detection signal transmitting means.

13. A microcomputer comprising:
a serial interface for receiving a debugging program applied thereto from a debugging tool;
a first register for holding an instruction code included with the debugging program, which is applied to said microcomputer via said serial interface;
a central processing unit or CPU for executing the instruction code held by said first register; and
valid control means for generating a valid signal indicating whether the instruction code held by said first register is valid or invalid, and a second register for holding the value of the valid signal generated by said valid control means, for enabling said debugging tool to read the value of the valid signal by way of said serial interface.

14. A microcomputer comprising:
a serial interface for receiving a debugging program applied thereto from a debugging tool;
a first register for holding an instruction code included with the debugging program, which is applied to said microcomputer via said serial interface;
a central processing unit or CPU for executing the instruction code held by said first register; and
valid control means for generating a valid signal indicating whether the instruction code held by said first register is valid or invalid, and internal bus interface means for furnishing a negated access completion signal to said CPU when the valid signal generated by said valid control means indicates that the instruction code held by said first register is invalid, and for furnishing an asserted access completion signal to said CPU when the valid signal generated by said valid control means indicates that the instruction code held by said first register is valid.

15. A microcomputer comprising:
a serial interface for receiving a debugging program applied thereto from a debugging tool;
a first register for holding an instruction code included with the debugging program, which is applied to said microcomputer via said serial interface;
a central processing unit or CPU for executing the instruction code held by said first register; and
valid control means for generating a valid signal indicating whether the instruction code held by said first register is valid or invalid, and output control means, responsive to an instruction-fetching request from said CPU, for furnishing a branch instruction to prevent a program counter's current value from incrementing to said CPU when the valid signal generated by said valid control means indicates that the instruction code held by said first register is invalid.

16. The microcomputer according to claim 15, wherein said output control means furnishes the branch instruction to prevent the program counter's current value from incrementing to said CPU when the instruction-fetching request is an instruction-prefetching request or when the valid signal generated by said valid control means indicates that the instruction code held by said first register is invalid.

17. A microcomputer comprising:

- a serial interface for receiving a debugging program applied thereto from a debugging tool;
- a first register for holding an instruction code included with the debugging program, which is applied to said microcomputer via said serial interface;
- a central processing unit or CPU for executing the instruction code held by said first register; and
- a second register for holding parameters applied thereto only by way of said serial interface, wherein said CPU can read the parameters held by said second register.

18. A microcomputer comprising:

- a serial interface for receiving a debugging program applied thereto from a debugging tool;
- a first register for holding an instruction code included with the debugging program, which is applied to said microcomputer via said serial interface;
- a central processing unit or CPU for executing the instruction code held by said first register;
- a second register for holding data applied thereto by way of said serial interface, wherein said CPU can read the data held by said second register; and
- valid control means for generating a valid signal indicating whether data held by said second register is valid or invalid, and a third register for holding the value of the valid signal generated by said valid control means and for enabling said debugging tool to read the value of the valid signal by way of said serial interface.

* * * * *